US011210772B2

(12) United States Patent
Goergen et al.

(10) Patent No.: US 11,210,772 B2
(45) Date of Patent: Dec. 28, 2021

(54) WEARABLE VISUALIZATION DEVICE SYSTEMS AND METHODS

(71) Applicant: Universal City Studios LLC, Universal City, CA (US)

(72) Inventors: Patrick John Goergen, Orlando, FL (US); Tomas Manuel Trujillo, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/738,906

(22) Filed: Jan. 9, 2020

(65) Prior Publication Data

US 2020/0226838 A1 Jul. 16, 2020

Related U.S. Application Data

(60) Provisional application No. 62/791,735, filed on Jan. 11, 2019.

(51) Int. Cl.
*G06T 7/00* (2017.01)
*H04N 5/225* (2006.01)
(Continued)

(52) U.S. Cl.
CPC ............ *G06T 7/0002* (2013.01); *G01P 15/18* (2013.01); *G02B 27/0101* (2013.01); *G02B 27/0172* (2013.01); *G02B 27/0176* (2013.01); *G06F 1/1626* (2013.01); *G06F 1/1637* (2013.01); *G06F 1/1694* (2013.01); *G06F 3/011* (2013.01);
(Continued)

(58) Field of Classification Search
None
See application file for complete search history.

(56) References Cited

U.S. PATENT DOCUMENTS 6,243,207 B1 6/2001 Kawamura et al.
6,259,565 B1 7/2001 Kawamura et al.
(Continued)

FOREIGN PATENT DOCUMENTS

EP 1643501 B1 6/2013
EP 2834718 B1 10/2018
(Continued)

OTHER PUBLICATIONS

PCT/US2020/013159 Invitation to Pay Additional Fees Apr. 28, 2020.
(Continued)

*Primary Examiner* — Ryan M Gray
(74) *Attorney, Agent, or Firm* — Fletcher Yoder, P.C.

(57) ABSTRACT

A wearable visualization device configured to provide a user with an augmented reality, a virtual reality, and/or a mixed reality experience includes a housing and a lens portion extending from the housing. The wearable visualization device includes a first display screen and a second display screen coupled to the housing and configured to project light onto the lens portion, where the lens portion is configured to reflect at least a portion of the light into eyes of the user. The wearable visualization device includes a camera positioned between the first display screen and the second display screen and configured to acquire image data of the lens portion.

20 Claims, 13 Drawing Sheets

(51) Int. Cl.

| | |
|---|---|
| *G06T 5/00* | (2006.01) |
| *G02B 27/01* | (2006.01) |
| *G06F 3/14* | (2006.01) |
| *G01P 15/18* | (2013.01) |
| *G06F 1/16* | (2006.01) |
| *G06F 3/01* | (2006.01) |
| *G06T 19/00* | (2011.01) |

(52) U.S. Cl.
CPC ............... *G06F 3/14* (2013.01); *G06T 5/006* (2013.01); *G06T 19/006* (2013.01); *H04N 5/2253* (2013.01); *G02B 2027/014* (2013.01); *G02B 2027/0138* (2013.01); *G06T 2207/30168* (2013.01)

(56) References Cited

U.S. PATENT DOCUMENTS

| | | | |
|---|---|---|---|
| 6,384,983 B1 | 5/2002 | Yamazaki et al. | |
| 7,012,756 B2 | 3/2006 | Takagi et al. | |
| 7,019,909 B2 | 3/2006 | Yamazaki et al. | |
| 7,350,394 B1 | 4/2008 | Flynn et al. | |
| 7,450,332 B2 | 11/2008 | Pasolini et al. | |
| 7,495,638 B2 | 2/2009 | Lamvik et al. | |
| 8,025,581 B2 | 9/2011 | Bryan et al. | |
| 8,212,859 B2 | 7/2012 | Tang et al. | |
| 8,408,041 B2 | 4/2013 | Ten Kate et al. | |
| 8,477,425 B2 | 7/2013 | Border et al. | |
| 8,511,827 B2 | 8/2013 | Hua et al. | |
| 8,576,276 B2 | 11/2013 | Bar-Zeev et al. | |
| 8,705,177 B1 | 4/2014 | Miao | |
| 8,767,014 B2 | 7/2014 | Vaught et al. | |
| 8,810,482 B2 | 8/2014 | Abdollahi et al. | |
| 8,866,870 B1 | 10/2014 | Smith | |
| 8,867,139 B2 | 10/2014 | Gupta | |
| 8,907,865 B2 | 12/2014 | Miyawaki et al. | |
| 8,941,559 B2 | 1/2015 | Bar-Zeev et al. | |
| 8,964,298 B2 | 2/2015 | Haddick et al. | |
| 9,052,505 B2 | 6/2015 | Cheng et al. | |
| 9,088,787 B1 | 7/2015 | Smith et al. | |
| 9,253,524 B2 | 2/2016 | Kaburlasos et al. | |
| 9,268,138 B2 | 2/2016 | Shimizu et al. | |
| 9,285,871 B2 | 3/2016 | Geisner et al. | |
| 9,286,730 B2 | 3/2016 | Bar-Zeev et al. | |
| 9,292,973 B2 | 3/2016 | Bar-Zeev et al. | |
| 9,310,591 B2 | 4/2016 | Hua et al. | |
| 9,310,610 B2 | 4/2016 | Border | |
| 9,316,834 B2 | 4/2016 | Makino et al. | |
| 9,342,610 B2 | 5/2016 | Liu et al. | |
| 9,354,446 B2 | 5/2016 | Abdollahi et al. | |
| 9,360,671 B1 | 6/2016 | Zhou | |
| 9,366,870 B2 | 6/2016 | Cheng et al. | |
| 9,366,871 B2 | 6/2016 | Ghosh et al. | |
| 9,383,582 B2 | 7/2016 | Tang et al. | |
| 9,389,423 B2 | 7/2016 | Bhardwaj et al. | |
| 9,395,811 B2 | 7/2016 | Vaught et al. | |
| 9,402,568 B2 | 8/2016 | Barfield | |
| 9,454,007 B1 | 9/2016 | Smith et al. | |
| 9,454,010 B1 | 9/2016 | Passmore et al. | |
| 9,497,501 B2 | 11/2016 | Mount et al. | |
| 9,519,144 B2 | 12/2016 | Lanman et al. | |
| D776,110 S | 1/2017 | Gribetz et al. | |
| D776,111 S | 1/2017 | Baldassi et al. | |
| 9,569,886 B2 | 2/2017 | Akenine-Moller et al. | |
| 9,576,399 B2 | 2/2017 | Lo et al. | |
| 9,581,819 B1 | 2/2017 | Boggs et al. | |
| 9,582,922 B2 | 2/2017 | Lanman et al. | |
| 9,588,341 B2 | 3/2017 | Bar-Zeev et al. | |
| 9,606,362 B2 | 3/2017 | Passmore et al. | |
| 9,638,836 B1 | 5/2017 | Harrison et al. | |
| 9,638,921 B2 | 5/2017 | Miller et al. | |
| 9,645,396 B2 | 5/2017 | Andes et al. | |
| 9,658,457 B2 | 5/2017 | Osterhout | |
| 9,658,460 B2 | 5/2017 | Lee et al. | |
| 9,667,954 B2 | 5/2017 | Tang | |
| 9,690,371 B2 | 6/2017 | Saito | |
| 9,690,374 B2 | 6/2017 | Clement et al. | |
| 9,690,375 B2 | 6/2017 | Blum et al. | |
| 9,696,552 B1 | 7/2017 | Goergen et al. | |
| 9,720,505 B2 | 8/2017 | Gribetz et al. | |
| 9,733,477 B2 | 8/2017 | Gupta | |
| 9,733,480 B2 | 8/2017 | Baek et al. | |
| 9,733,481 B2 | 8/2017 | Carollo et al. | |
| 9,741,125 B2 | 8/2017 | Baruch et al. | |
| 9,763,342 B2 | 9/2017 | Long et al. | |
| 9,773,438 B1 | 9/2017 | Gribetz et al. | |
| 9,778,467 B1 | 10/2017 | White et al. | |
| 9,839,857 B2 | 12/2017 | Wagner | |
| D807,882 S | 1/2018 | Gribetz et al. | |
| 9,864,406 B2 | 1/2018 | Miller et al. | |
| 9,869,862 B2 | 1/2018 | Cheng et al. | |
| 9,874,749 B2 | 1/2018 | Bradski et al. | |
| 9,877,016 B2 | 1/2018 | Esteban et al. | |
| 9,885,871 B2 | 2/2018 | Abdollahi et al. | |
| D812,612 S | 3/2018 | Gribetz et al. | |
| 9,928,661 B1 | 3/2018 | Kinstner et al. | |
| 9,933,624 B1 | 4/2018 | White et al. | |
| 9,939,650 B2 | 4/2018 | Smith et al. | |
| 9,958,951 B1 | 5/2018 | Gribetz | |
| 9,983,697 B1 | 5/2018 | Gribetz | |
| 9,984,505 B2 | 5/2018 | Rimon et al. | |
| 9,984,510 B1 | 5/2018 | Kinstner et al. | |
| 9,990,779 B2 | 6/2018 | Kinstner et al. | |
| 9,990,872 B1 | 6/2018 | Gribetz et al. | |
| 10,003,726 B2 * | 6/2018 | Price | G06T 19/006 |
| 10,026,231 B1 | 7/2018 | Gribetz et al. | |
| 10,026,232 B2 | 7/2018 | Lo et al. | |
| 10,037,629 B2 | 7/2018 | Kinstner et al. | |
| D825,560 S | 8/2018 | Gribetz et al. | |
| D825,561 S | 8/2018 | Gribetz et al. | |
| 10,043,305 B2 | 8/2018 | Lo et al. | |
| 10,057,968 B2 | 8/2018 | Gribetz et al. | |
| D830,359 S | 10/2018 | Gribetz et al. | |
| 10,088,685 B1 | 10/2018 | Aharoni et al. | |
| 10,127,727 B1 | 11/2018 | Yuan et al. | |
| 10,168,768 B1 | 1/2019 | Kinstner | |
| 10,168,789 B1 | 1/2019 | Soto et al. | |
| 10,168,791 B2 | 1/2019 | Gribetz et al. | |
| 10,186,088 B2 | 1/2019 | Kinstner et al. | |
| 10,212,517 B1 | 2/2019 | Beltran et al. | |
| 10,260,864 B2 | 4/2019 | Edwin et al. | |
| 10,565,446 B2 * | 2/2020 | Gustafsson | G06F 3/013 |
| 2006/0072206 A1 | 4/2006 | Tsuyuki et al. | |
| 2006/0250322 A1 | 11/2006 | Hall et al. | |
| 2012/0212398 A1 | 8/2012 | Border et al. | |
| 2012/0320100 A1 | 12/2012 | Machida et al. | |
| 2013/0137076 A1 | 5/2013 | Perez et al. | |
| 2013/0318776 A1 * | 12/2013 | Jacobs | G06F 3/013 29/592.1 |
| 2014/0118829 A1 | 5/2014 | Ma et al. | |
| 2014/0146394 A1 | 5/2014 | Tout et al. | |
| 2014/0168264 A1 | 6/2014 | Harrison et al. | |
| 2014/0364208 A1 | 12/2014 | Perry | |
| 2014/0364209 A1 | 12/2014 | Perry | |
| 2015/0003819 A1 | 1/2015 | Ackerman et al. | |
| 2015/0103152 A1 | 4/2015 | Qin | |
| 2015/0198808 A1 * | 7/2015 | Morifuji | G02B 27/0179 345/8 |
| 2015/0312561 A1 | 10/2015 | Hoof et al. | |
| 2016/0011341 A1 | 1/2016 | Smith | |
| 2016/0062454 A1 | 3/2016 | Wang et al. | |
| 2016/0093230 A1 | 3/2016 | Boggs et al. | |
| 2016/0097929 A1 | 4/2016 | Yee et al. | |
| 2016/0097930 A1 | 4/2016 | Robbins et al. | |
| 2016/0098095 A1 | 4/2016 | Gonzalez-Banos et al. | |
| 2016/0109710 A1 | 4/2016 | Smith et al. | |
| 2016/0171779 A1 | 6/2016 | Bar-Zeev et al. | |
| 2016/0188943 A1 | 6/2016 | Franz | |
| 2016/0210784 A1 | 7/2016 | Ramsby et al. | |
| 2016/0223822 A1 | 8/2016 | Harrison et al. | |
| 2016/0240013 A1 | 8/2016 | Spitzer | |
| 2016/0262608 A1 | 9/2016 | Krueger | |
| 2016/0292918 A1 * | 10/2016 | Cummings | G02B 27/0101 |
| 2016/0346704 A1 | 12/2016 | Wagner | |

(56) References Cited

U.S. PATENT DOCUMENTS

| | | |
|---|---|---|
| 2016/0353089 A1 | 12/2016 | Gallup et al. |
| 2016/0364907 A1 | 12/2016 | Schoenberg |
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0053445 A1 | 2/2017 | Chen et al. |
| 2017/0053446 A1 | 2/2017 | Chen et al. |
| 2017/0053447 A1 | 2/2017 | Chen et al. |
| 2017/0059831 A1 | 3/2017 | Hua et al. |
| 2017/0108696 A1 | 4/2017 | Harrison et al. |
| 2017/0116950 A1 | 4/2017 | Onal |
| 2017/0131581 A1 | 5/2017 | Pletenetskyy |
| 2017/0171538 A1 | 6/2017 | Bell et al. |
| 2017/0176747 A1 | 6/2017 | Vallius et al. |
| 2017/0178408 A1 | 6/2017 | Bavor, Jr. et al. |
| 2017/0188021 A1 | 6/2017 | Lo et al. |
| 2017/0193679 A1 | 7/2017 | Wu et al. |
| 2017/0206713 A1 | 7/2017 | Lo et al. |
| 2017/0208318 A1 | 7/2017 | Passmore et al. |
| 2017/0212717 A1 | 7/2017 | Zhang |
| 2017/0220134 A1 | 8/2017 | Burns |
| 2017/0221264 A1 | 8/2017 | Perry |
| 2017/0236320 A1 | 8/2017 | Gribetz et al. |
| 2017/0236332 A1 | 8/2017 | Kipman et al. |
| 2017/0237789 A1 | 8/2017 | Harner et al. |
| 2017/0242249 A1 | 8/2017 | Wall et al. |
| 2017/0255011 A1 | 9/2017 | Son et al. |
| 2017/0262046 A1 | 9/2017 | Clement et al. |
| 2017/0262047 A1 | 9/2017 | Saito |
| 2017/0270841 A1 | 9/2017 | An et al. |
| 2017/0277256 A1 | 9/2017 | Burns et al. |
| 2017/0285344 A1 | 10/2017 | Benko et al. |
| 2017/0293144 A1 | 10/2017 | Cakmakci et al. |
| 2017/0305083 A1 | 10/2017 | Smith et al. |
| 2017/0316607 A1 | 11/2017 | Khalid et al. |
| 2017/0323416 A1 | 11/2017 | Finnila |
| 2017/0323482 A1 | 11/2017 | Coup et al. |
| 2017/0336863 A1 | 11/2017 | Tilton et al. |
| 2017/0337737 A1 | 11/2017 | Edwards et al. |
| 2017/0345198 A1 | 11/2017 | Magpuri et al. |
| 2017/0352226 A1 | 12/2017 | Matsuzawa et al. |
| 2017/0363872 A1 | 12/2017 | Border et al. |
| 2017/0363949 A1 | 12/2017 | Valente et al. |
| 2017/0364145 A1 | 12/2017 | Blum et al. |
| 2018/0003962 A1 | 1/2018 | Urey et al. |
| 2018/0018515 A1 | 1/2018 | Spizhevoy et al. |
| 2018/0024370 A1 | 1/2018 | Carollo et al. |
| 2018/0032101 A1 | 2/2018 | Jiang |
| 2018/0033199 A9 | 2/2018 | Eatedali et al. |
| 2018/0052501 A1* | 2/2018 | Jones, Jr. ............... G06F 3/011 |
| 2018/0059715 A1 | 3/2018 | Chen et al. |
| 2018/0059776 A1 | 3/2018 | Jiang et al. |
| 2018/0095498 A1 | 4/2018 | Raffle et al. |
| 2018/0098056 A1* | 4/2018 | Bohn ..................... G09G 3/003 |
| 2018/0104601 A1 | 4/2018 | Wagner |
| 2018/0164594 A1 | 6/2018 | Lee et al. |
| 2018/0196262 A1 | 7/2018 | Cage |
| 2018/0196512 A1* | 7/2018 | Kim ................... G02B 27/0172 |
| 2018/0203240 A1 | 7/2018 | Jones et al. |
| 2018/0293041 A1 | 10/2018 | Harviainen |
| 2019/0082170 A1* | 3/2019 | Akahori ............... G06K 9/0061 |
| 2019/0094554 A1 | 3/2019 | Benesh et al. |
| 2019/0171023 A1* | 6/2019 | Carlvik ............... G02B 27/0172 |
| 2019/0318706 A1 | 10/2019 | Peng et al. |
| 2019/0333480 A1* | 10/2019 | Lang .................... G02B 27/017 |
| 2019/0349576 A1* | 11/2019 | Yildiz ................ G02B 27/0149 |
| 2020/0341269 A1* | 10/2020 | Mills .................. G02B 27/0093 |

FOREIGN PATENT DOCUMENTS

| | | |
|---|---|---|
| GB | 2562758 A | 11/2018 |
| JP | 2012141461 A | 7/2012 |
| JP | 5790187 B2 | 10/2015 |
| JP | 5801401 B2 | 10/2015 |
| JP | 2015228050 A | 12/2015 |
| JP | 5913346 B2 | 4/2016 |
| JP | 2016028942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| KR | 100630762 B1 | 9/2006 |
| WO | WO-2008044569 A1 | 4/2008 |
| WO | WO-2014106041 A1 | 7/2014 |
| WO | WO-2018213727 A1 | 11/2018 |

OTHER PUBLICATIONS

U.S. Appl. No. 16/738,908, filed Jan. 9, 2020, Patrick John Goergen.
U.S. Appl. No. 16/738,788, filed Jan. 9, 2020, Andrew Brian Raij
U.S. Appl. No. 16/738,917, Jan. 9, 2020, Douglas Evan Goodner.

* cited by examiner

WEARABLE VISUALIZATION DEVICE SYSTEMS AND METHODS

CROSS-REFERENCE TO RELATED APPLICATIONS

This application claims priority to and the benefit of U.S. Provisional Application No. 62/791,735, entitled "AUGMENTED REALITY (AR) HEADSET FOR HIGH THROUGHPUT ATTRACTIONS," filed Jan. 11, 2019, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks may include various entertainment attractions, restaurants, and rides useful in providing enjoyment to guests. Areas of the amusement park may have different themes that are specifically targeted to certain audiences. For example, certain areas may include themes that are traditionally of interest to children, while other areas may include themes that are traditionally of interest to more mature audiences. Generally, such areas having themes may be referred to as an attraction or a themed attraction. It is recognized that it may be desirable to enhance the immersive experience for guests of such attractions, such as by augmenting the themes with virtual features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a wearable visualization device configured to provide a user with an augmented reality, a virtual reality, and/or a mixed reality experience includes a housing and a lens portion extending from the housing. The wearable visualization device includes a first display screen and a second display screen coupled to the housing and configured to project light onto the lens portion, where the lens portion is configured to reflect at least a portion of the light into eyes of the user. The wearable visualization device also includes a camera positioned between the first display screen and the second display screen and configured to acquire image data of the lens portion.

In one embodiment, an augmented reality, virtual reality, and/or mixed reality (AR/VR) system, includes a wearable visualization device. The wearable visualization device includes a housing, a lens portion extending from the housing, and a display assembly having a frame removably coupled to the housing. A first display screen, a second display screen, and a camera are coupled to the frame, where the camera is positioned between the first and second display screens.

In one embodiment, a wearable visualization device configured to provide a user with an augmented reality, a virtual reality, and/or a mixed reality experience includes a lens portion and a display screen configured to project virtual features onto a first location on the lens portion. The wearable visualization device includes a camera configured to acquire image data indicative of reflections viewable on the lens portion, where the reflections comprise a first reflection of a first eye of the user and a second reflection of a second eye of the user. The wearable visualization device includes a processor communicatively coupled to the camera and the display screen, where the processor is configured to adjust projection of the virtual features from the first location to a second location on the lens portion based on the image data.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
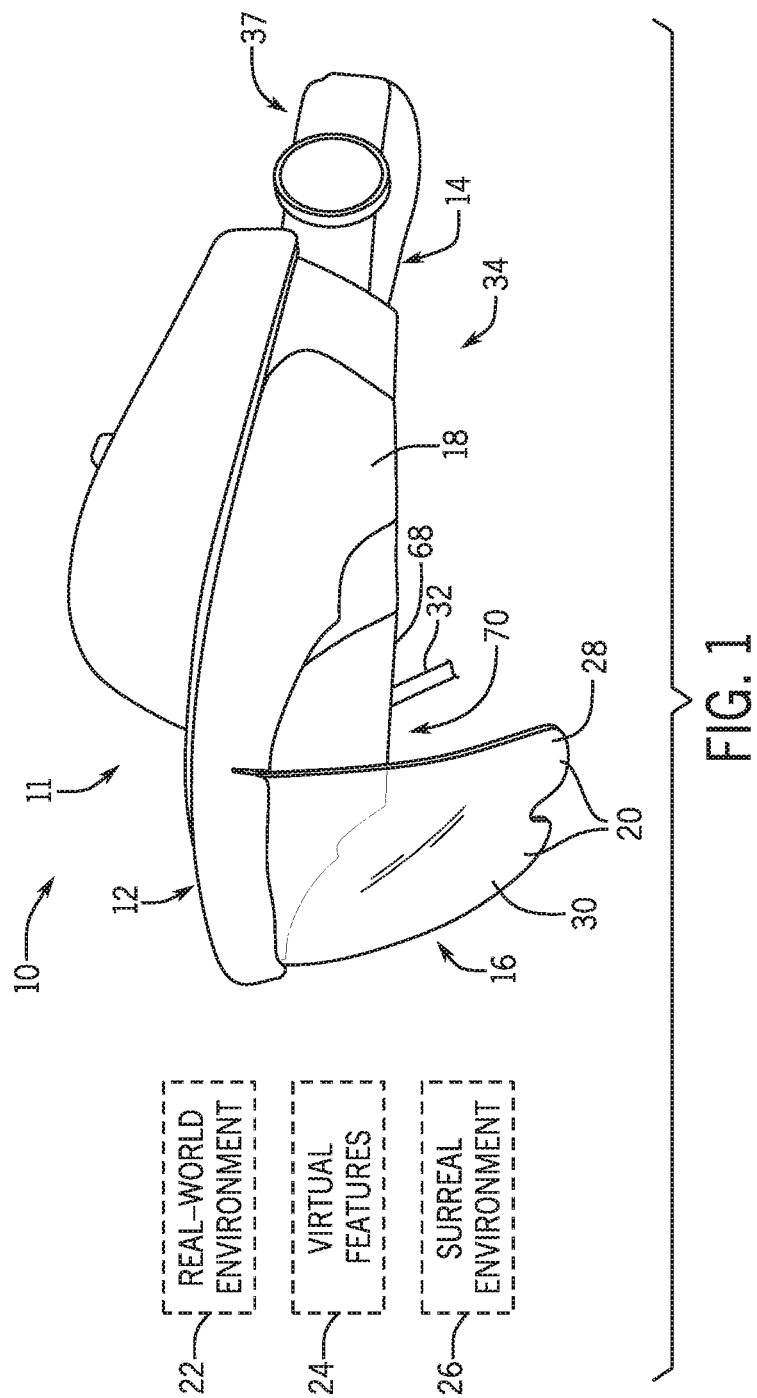
FIG. 1 is a perspective view of a wearable visualization device and an interface device of an augmented reality, virtual reality, and/or mixed reality system (AR/VR system) in an engaged configuration, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (combination of AR and VR) system (AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive.

For example, the AR/VR system may include a wearable visualization device, such as a head mounted display (e.g., electronic goggles or displays, eyeglasses), which may be worn by a guest and may be configured to enable the guest to view AR/VR scenes. In particular, the wearable visualization device may be utilized to enhance a guest experience by virtually overlaying features in a real-world environment of the amusement park, by providing adjustable virtual environments to provide different experiences in an amusement park ride, and so forth. Unfortunately, without the disclosed embodiments, it may be expensive and/or time-consuming to manufacture and assemble the wearable visualization device. Moreover, without the disclosed embodiments, it may be difficult to effectively integrate the wearable visualization device with an amusement park ride.

Therefore, embodiments of the present disclosure relate to a wearable visualization device having a multi-piece housing that facilitates manufacture and assembly of the wearable visualization device. In particular, the housing may include one or more detachable panels, such as a chassis, a lid, and a lens mount, which may, in an assembled configuration, form the housing. Certain of the panels may include component mating features (e.g., machined or molded features formed on surfaces of the panels) that are configured to receive and/or couple to various sub-components (e.g., electronic components; optical components) of the wearable visualization device. The component mating features enable the sub-components to be coupled to the panels prior to assembly of the housing, while various portions of the panels may be more easily accessible to an operator (e.g., a human technician; an assembly robot). After installation of the sub-components on one or more of the panels, the panels may be assembled to form the housing. In the assembled configuration, the housing may substantially isolate at least a portion of the sub-components from a surrounding ambient environment.

Embodiments of the wearable visualization device disclosed herein may also include various integration features that facilitate integration of the wearable visualization device with an attraction (e.g., an amusement park ride). For example, the integration features may include a camera that is coupled to the housing of the wearable visualization device and configured to acquire biometric information (e.g., an interpupillary distance) of a guest wearing the wearable visualization device. Particularly, the camera may acquire such biometric information when the guest first equips the wearable visualization device on their head (e.g., such as when the guest initially boards a ride vehicle of the attraction). A processing system of the wearable visualization device may be configured to calibrate certain components (e.g., one or more display screens) of the wearable visualization device based on the acquired biometric information of the guest, such that the wearable visualization device may more effectively provide the guest with AR/VR experiences. In some embodiments, the processing system may further utilize the image data acquired by the camera to determine whether the wearable visualization device is appropriately fitted on the guest's head. As an example, the processing system may utilize the acquired image data to determine whether one or more lenses or displays of the wearable visualization device are appropriately aligned with eyes of the guest (e.g., in a manner that facilitates effective presentation of AR/VR content to the guest). If the processing system determines that the wearable visualization device is misaligned on the guest's head (e.g., with respect to the eyes of the guest), the processing system may generate an alert instructing the guest and/or a ride technician operating the attraction to perform a corrective action. These and other features will be described in detail below with reference to the drawings.

With the foregoing in mind, FIG. 1 is a perspective view an embodiment of an AR/VR system 10 configured to enable a user (e.g., a guest, an amusement park employee, a passenger of a ride vehicle) to experience (e.g., view, interact with) AR/VR scenes. The AR/VR system 10 includes a wearable visualization system 11 having a wearable visualization device 12 (e.g., a head mounted display) and a guest interface device 14 that, as discussed in detail below, are removably coupleable to one another to facilitate usage of the AR/VR system 10.

In the illustrated embodiment, the wearable visualization device 12 includes a lens portion 16 (e.g., AR/VR eyeglasses, goggles) that is coupled to a housing 18 of the wearable visualization device 12. The lens portion 16 may include one or more lenses 20 or displays (e.g., transparent, semi-transparent, opaque) onto which certain virtual features 24 (e.g., AR features) may be overlaid. In some embodiments, the lenses 20 may enable the user to view a real-world environment 22 (e.g., physical structures in the attraction) through the lenses 20 with certain virtual features 24 overlaid onto the lenses 20 so that the user perceives the virtual features 24 as being integrated into the real-world environment 22. That is, the lens portion 16 may at least partially control a view of the user by overlaying the virtual features 24 onto a line of sight of the user. To this end, the wearable visualization device 12 may enable the user to visualize and perceive a surreal environment 26 (e.g., a game environment) having certain virtual features 24 overlaid onto the physical, real-world environment 22 viewable by the user through the lenses 20.

By way of non-limiting example, the lenses 20 may include transparent (e.g., see-through) light emitting diode (LED) displays or transparent (e.g., see-through) organic light emitting diode (OLED) displays. In some embodiments, the lens portion 16 may be formed from a single-piece construction that spans a certain distance so as to display images to both eyes of the user. That is, in such embodiments, the lenses 20 (e.g., a first lens 28, a second lens 30) may be formed from a single, continuous piece of material, where the first lens 28 may be aligned with a first eye (e.g., left eye) of the user and the second lens 30 may be aligned with a second eye (e.g., right eye) of the user. In other embodiments, the lens portion 16 may be a multi-piece construction that is formed from two or more separate lenses 20.

In some embodiments, the wearable visualization device 12 may completely control the view of the user (e.g., using opaque viewing surfaces). That is, the lenses 20 may include opaque or non-transparent displays configured to display virtual features 24 (e.g., VR features) to the user. As such, the surreal environment 26 viewable by the user may be, for example, a real-time video that includes real-world images of the physical, real-world environment 22 electronically merged with one or more virtual features 24. Thus, in wearing the wearable visualization device 12, the user may feel completely encompassed by the surreal environment 26 and may perceive the surreal environment 26 to be the real-world environment 22 that includes certain virtual features 24. In some embodiments, the wearable visualization device 12 may include features, such as light projection features, configured to project light into one or both eyes of the user so that certain virtual features 24 are superimposed over real-world objects viewable by the user. Such a wearable visualization device 12 may be considered to include a retinal display.

As such, it should be appreciated that the surreal environment 26 may include an AR experience, a VR experience, a mixed reality experience, a computer-mediated reality experience, a combination thereof, or other similar surreal environment. Moreover, it should be understood that the wearable visualization device 12 may be used alone or in combination with other features to create the surreal environment 26. Indeed, as discussed below, the user may wear the wearable visualization device 12 throughout a duration of a ride of an amusement park ride or during another time, such as during a game, throughout a particular area or attraction of an amusement park, during a ride to a hotel associated with the amusement park, at the hotel, and so forth. In some embodiments, when implemented in the amusement park setting, the wearable visualization device 12 may be physically coupled to (e.g., tethered via a cable 32) to a structure (e.g., a ride vehicle of the amusement park ride) to block separation of the wearable visualization device 12 from the structure and/or may be electronically coupled to (e.g., via the cable 32) a computing system (e.g., a computer graphics generation system) to facilitate operation of the wearable visualization device 12 (e.g., display of the virtual features 24).

As discussed below, the wearable visualization device 12 is removably coupleable (e.g., toollessly coupleable; coupleable without tools; coupled without threaded fasteners, such as bolts; separable without tools and without breaking the components of the wearable visualization device 12 or the guest interface device 14) to the guest interface device 14 to enable the wearable visualization device 12 to quickly transition between an engaged configuration 34, in which the wearable visualization device 12 is coupled to the guest interface device 14, and a disengaged or detached configuration 36 (see, e.g., FIG. 2), in which the wearable visualization device 12 is decoupled from the guest interface device 14. The guest interface device 14 is configured to be affixed to the user's head and, thus, enable the user to comfortably wear the wearable visualization device 12 throughout various attractions or while traversing certain amusement park environments. For example, the guest interface device 14 may include a head strap assembly 37 that is configured to span about a circumference of the user's head and configured to be tightened (e.g., constricted) on the user's head. In this manner, the head strap assembly 37 facilitates affixing the guest interface device 14 to the head of the user, such that the guest interface device 14 may be utilized to retain the wearable visualization device 12 on the user (e.g., when the wearable visualization device 12 is in the engaged configuration 34). The guest interface device 14 enables the user to couple and decouple the wearable visualization device 12 from the guest interface device 14 (e.g., without detachment of the guest interface device 14 from the user's head).

Figure 2:
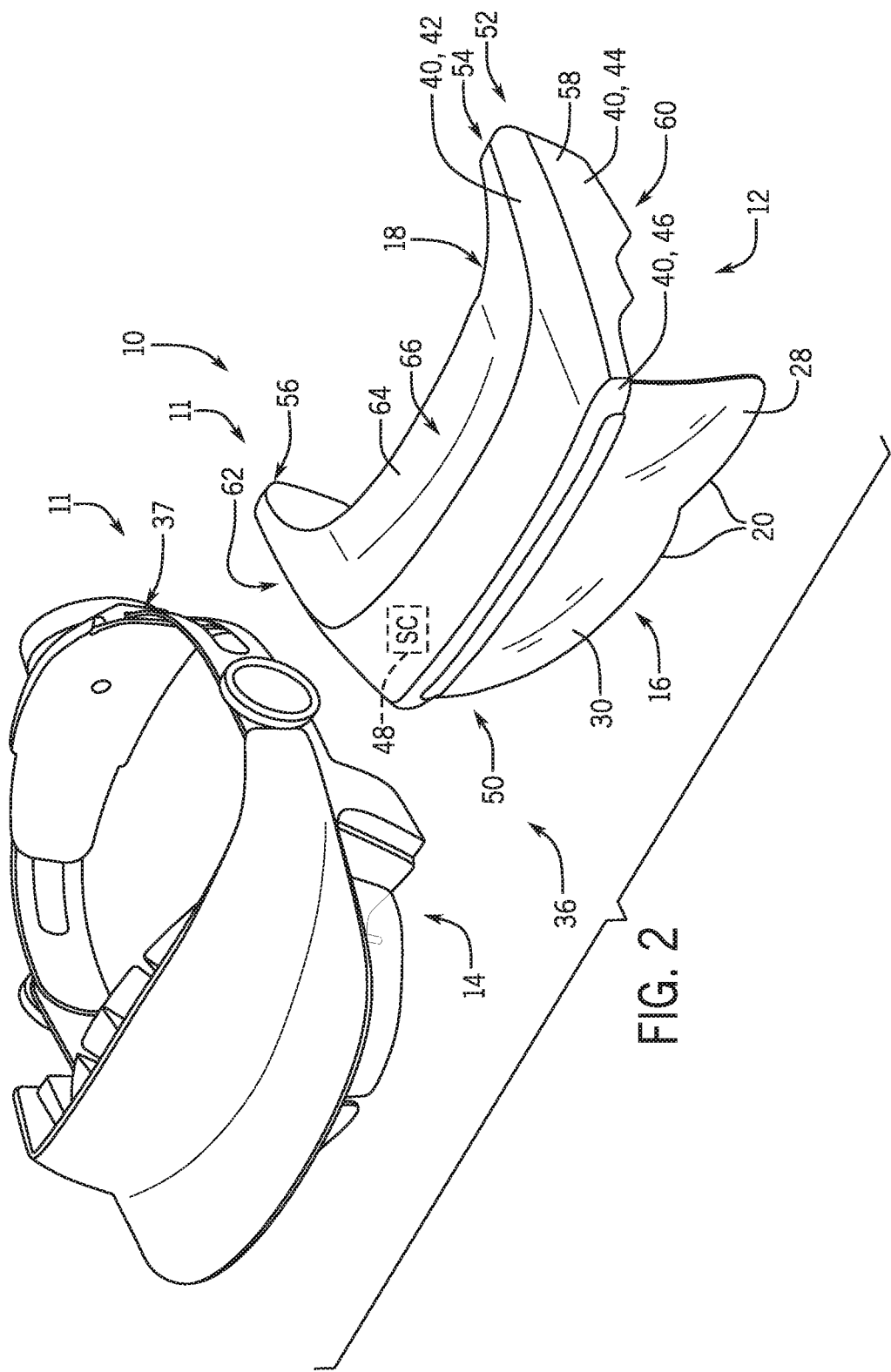
FIG. 2 is a perspective view of the wearable visualization device and the interface device of FIG. 1 in a detached configuration, in accordance with present embodiments.

FIG. 2 is a perspective view of an embodiment of the AR/VR system 10, illustrating the wearable visualization device 12 and the guest interface device 14 in the detached configuration 36. As briefly discussed above, the housing 18 of the wearable visualization device 12 may be a multi-component assembly configured to facilitate assembly and/or maintenance of the wearable visualization device 12. For example, in some embodiments, the housing 18 may be assembled from multiple panels 40 (e.g., housing sections; molded and/or machined panels), such as a lid 42, a chassis 44, and a lens mount 46 (e.g., a panel configured to support the lens portion 16), which may collectively form the housing 18. As discussed below, some of or all of the panels 40 may include component mating features (e.g., machined and/or molded features on surfaces of the panels 40) that are configured to receive and/or couple to various sub-components 48 (e.g., electronic components; optical components) of the wearable visualization device 12. In this manner, the sub-components 48 may be coupled to, for example, the lid 42, the chassis 44, and/or the lens portion 16, prior to assembly of the housing 18, while the component mating features of these panels 40 are easily accessible to an operator (e.g., as compared to when the housing 18 is in an assembled or partially assembled configuration).

As discussed below, after installation of the sub-components 48 on one or more of the panels 40, the panels 40 may be assembled (e.g., coupled to one another via fasteners, adhesives, and/or other techniques) to form the housing 18.

The housing 18 may therefore encapsulate the sub-components 48 to substantially seal (e.g., hermetically seal) at least a portion of the sub-components 48 within the housing 18 to shield these sub-components 48 from direct exposure to ambient environmental elements (e.g., moisture) surrounding the wearable visualization device 12. It be understood that, in other embodiments, the housing 18 may be assembled from additional or fewer panels than the lid 42, the chassis 44, and the lens mount 46. Indeed, in certain embodiments, the housing 18 may include 1, 2, 3, 4, 5, 6, or more than six individual panels 40 that, in an assembled configuration, may collectively form the housing 18.

In the illustrated embodiment, the housing 18 includes a forward end portion 50 (e.g., a first end portion) that is proximate to the lenses 20 and rearward end portion 52 (e.g., a second end portion) that is distal to the lenses 20. In particular, the rearward end portion 52 includes a first peripheral portion 54 (e.g., a first distal end) and a second peripheral portion 56 (e.g., a second distal end) that, as discussed below, facilitate removably coupling the wearable visualization device 12 to the guest interface device 14. The chassis 44 includes a first outer surface 58 that may define a first lateral end portion 60 of the housing 18 and a second outer surface, opposite to the first outer surface 58, which may define a second lateral end portion 62 of the housing 18. The lid 42 includes an upper surface 64 that may define a top portion 66 of the housing 18. The chassis includes a lower surface 68 (see, e.g., FIG. 1) that may define an underside 70 (see, e.g., FIG. 1) of the housing 18. For clarity, relative terms, such as, for example, forward, rearward, lateral, upper, and lower are used throughout the following discussion to describe relative positions of various components or regions of the wearable visualization device 12 with respect to other components or regions of the wearable visualization device 12, and are not intended to denote a particular direction or spatial orientation. As such, it should be understood that such relative terms are intended to facilitate discussion and are dependent upon an orientation of an observer with respect to the wearable visualization device 12.

Figure 3:
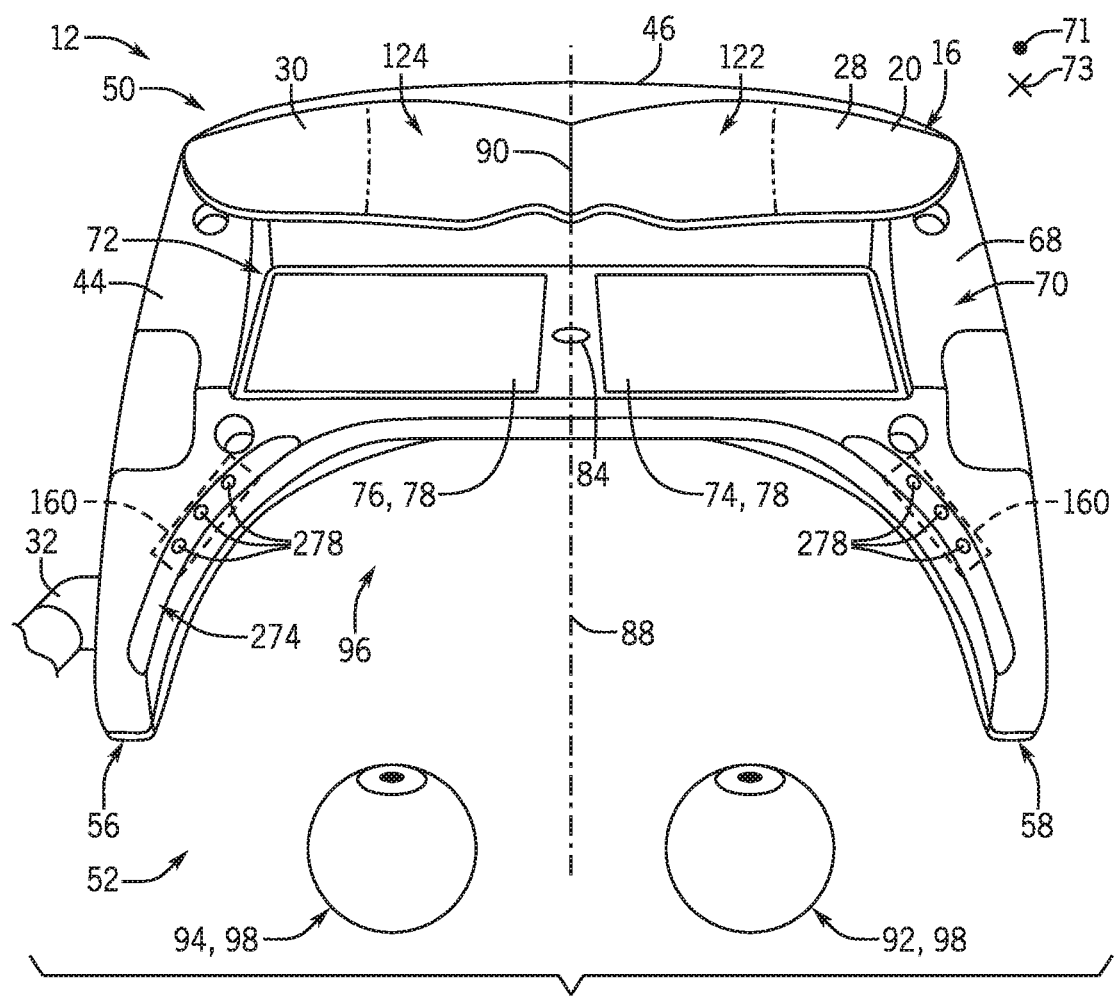
FIG. 3 is a bottom view of the wearable visualization device of FIG. 1, in accordance with present embodiments.

FIG. 3 is a bottom view of an embodiment of the wearable visualization device 12, illustrating the underside 70 of the housing 18. As shown in the illustrated embodiment, the lens portion 16 may extend from the lower surface 68 of the chassis 44, generally along a first direction 71. In some embodiments, the lens mount 46 may removably couple the lens portion 16 to the chassis 44. As such, the lens mount 46 may enable replacement of the lens portion 16 with another lens portion (e.g., if the lens portion 16 incurs wear).

The chassis 44 may include a recess 72 that extends in a second direction 73, generally opposite to the first direction 71, and that slopes from the rearward end portion 52 of the housing 18 toward the forward end portion 50 of the housing 18. The wearable visualization device 12 may include a first screen 74 (e.g., a first display screen) and a second screen 76 (e.g., a second display screen), collectively referred to herein as screens 78, which may be coupled to the housing 18 and positioned within the recess 72. Particularly, as discussed below, the first screen 74 may be positioned within a first opening 80 (see, e.g., FIG. 7) of the chassis 44 and the second screen 76 may be positioned within a second opening 82 (see, e.g., FIG. 7) of the chassis 44, such that the screens 78 are angled toward the lenses 20 (see, e.g., FIG. 4). As discussed below, in this manner, the screens 78 may project light (e.g., virtual features) onto the lens portion 16, such that the lens portion 16 may reflect at least a portion of the projected light into the eyes of the user.

In some embodiments, a camera 84 may be positioned within the recess 72 and between the first and second screens 74, 76 (e.g., along a lateral axis of the wearable visualization device 12). Particularly, the camera 84 may be disposed within a camera opening 86 (see, e.g., FIG. 7) of the chassis 44 and may be aligned with a centerline 88 (e.g., a line extending parallel and equidistantly between the screens 78) of the wearable visualization device 12. In certain embodiments, a lens of the camera 84 may be oriented substantially co-planar to respective display surfaces of the first and second screens 74, 76. As discussed in detail below, in this manner, the camera 84 may acquire image data indicative of reflections that may be viewable on an interior surface (e.g., a surface facing the screens 78) of the lens portion 16. Particularly, the camera 84 may acquire image data indicative of a reflection of light projected onto the lens portion 16 by the screens 78 and/or of a reflection of the user's eyes that may be viewable in the lens portion 16 (e.g., when the wearable visualization device 12 is fitted on the user's head).

The screens 78 may include any suitable displays that are configured to project virtual features onto the lenses 20. By way on non-limiting example, the screens 78 may include liquid crystal displays (LCDs), LED displays, OLED displays, or other suitable displays. In any case, the first screen 74 may project AR/VR content onto the first lens 28 and the second screen 76 may project AR/VR content onto the second lens 30. In this manner, the screens 78 may facilitate generation of the surreal environment 26 in accordance with the techniques discussed above. It should be understood that, in some embodiments, the screens 78 may include a first section or segment and a second section or segment of a single screen, instead of a two separate screens. That is, the first screen 74 may include a first section or segment of a particular screen, and the second screen 76 may include a second section or segment of the particular screen.

As shown in the illustrated embodiment, the first and second lenses 28, 30 may each include a concave curvature that extends from a midline 90 of the lens portion 16. The midline 90 may be substantially aligned with (e.g., parallel to) the centerline 88. The concave curvature of the first and second lenses 28, 30 may facilitate reflection of some of or substantially all of the light projected onto the lenses 20 by the screens 78 back into the eyes of the user. For example, the concave curvature of the first lens 28 may enable the first lens 28 to reflect light (e.g., AR/VR content projected onto the first lens 28 by the first screen 74) into a first eye 92 of the user and enables the second lens 30 to reflect light (e.g., AR/VR content projected onto the second lens 30 by the second screen 76) into a second eye 94 of the user. As such, the user may view the AR/VR content that may be projected onto the lenses 20 (e.g., by the screens 78) and, therefore, perceive the surreal environment 26. Throughout the following discussion, the lenses 20 and the screens 78 may collectively be referred to as a display system 96 of the wearable visualization device 12.

Figure 4:
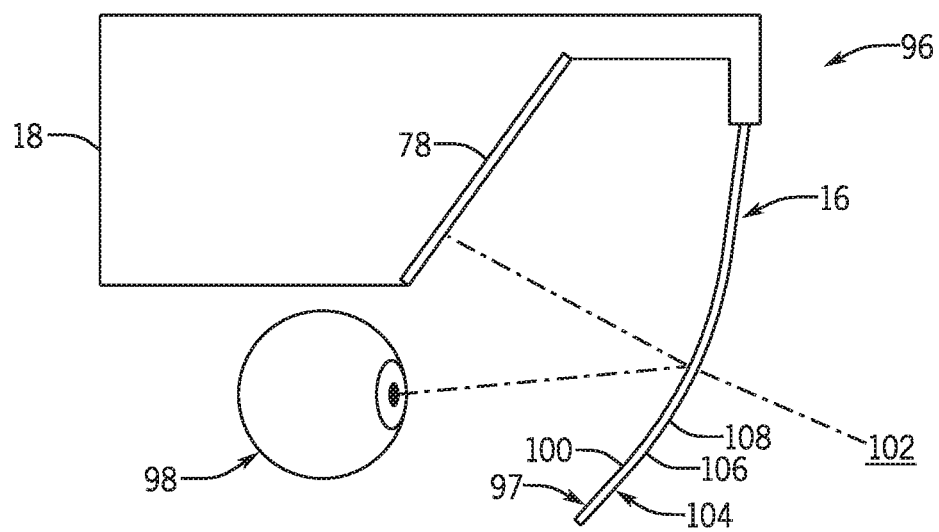
FIG. 4 is a schematic side view of a display system that may be used in the wearable visualization device of FIG. 1, in accordance with present embodiments.

FIG. 4 is a schematic side view of an embodiment of the display system 96. In some embodiments, the lens portion 16 may include a substantially transparent (e.g., see-through) piece of material that is coated with one or more reflective layers that enhance reflective properties of the lens portion 16. For example, in some embodiments, an interior surface 97 of the lens portion 16, facing the first and second eyes 92, 94 (collectively eyes 98), may be coated with a reflective layer 100 that may reflect between about 20 percent and about 80 percent, between about 50 percent and about 70 percent, or about 62.5 percent of the light projected onto the lens portion 16 (e.g., by the screens 78) back into the eyes 98 of the user, while a remaining portion of the light projected onto the lens portion 16 (e.g., by the screens 78) passes through the lens portion 16 and disperses in an ambient environment 102. In other embodiments, the reflective layer 100 may reflect any suitable portion of the light projected onto the interior surface 97 of the lens portion 16 (e.g., by the screens 78) back into the eyes 98 of the user. The reflective layer 100 may include a single coating or layer of material that is applied to the interior surface 97 of the lens portion 16 or a plurality of coatings or layers of material that are applied to the interior surface 97.

In some embodiments, an exterior surface 104 (e.g., facing away from the eyes 98 of the user) of the lens portion 16 may be coated with one or more layers of an anti-reflective coating 106. The anti-reflective coating 106 may permit ambient light (e.g., sunlight) to pass through the lens portion 16 (e.g., from the exterior surface 104 to the interior surface 97) substantially without creating reflections in the lens portion 16 (e.g., reflections that may reduce a quality of the virtual features projected onto the lens portion 16 by the screens 78). Additionally or alternatively, the exterior surface 104 may be coated with one or more layers of scratch resistant coating 108 that may protect the lens portion 16 from acquiring scratches or other surface blemishes during repetitive usage of the wearable visualization device 12. In some embodiments, one or more layers of the scratch resistant coating 108 may also be applied to the interior surface 97 of the lens portion 16.

Figure 5:
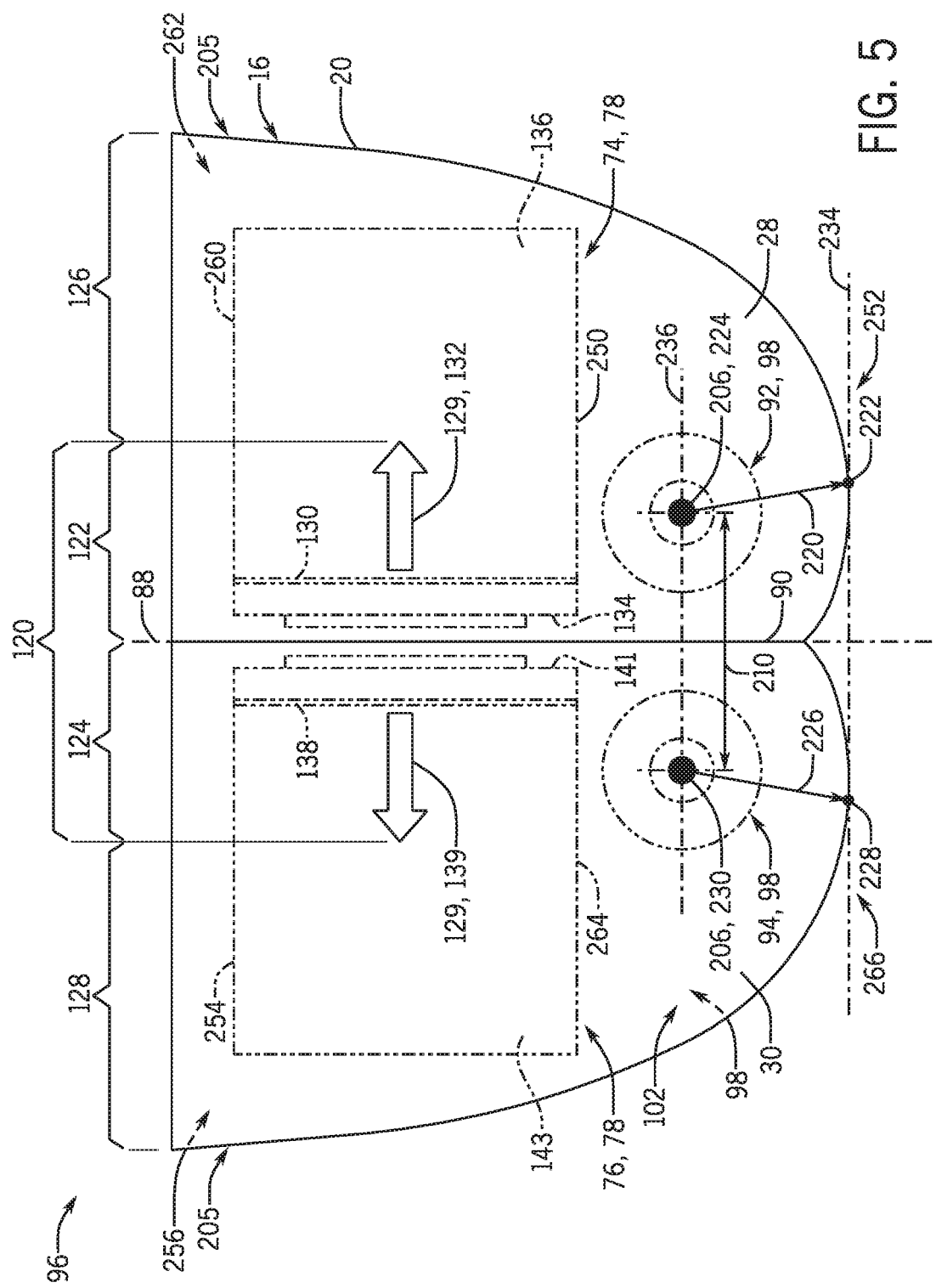
FIG. 5 is a schematic front view of a display system that may be used in the wearable visualization device of FIG. 1, in accordance with present embodiments.

FIG. 5 is a schematic of an embodiment of the display system 96. Generally, a user's foveal vision (e.g., central field of view) may be located near a central region 120 of the lens portion 16. Particularly, the foveal vision of the first eye 92 of the user may encompass a first section 122 of the first lens 28, while the foveal vision of the second eye 94 of the user may encompass a first section 124 of the second lens 30. A second section 126 of the first lens 28 may correspond to a region of peripheral vision of the first eye 92, while a second section 128 of the second lens 30 may correspond to a region of peripheral vision of the second eye 94.

The screens 78 may be configured to raster light (e.g., virtual features; AR/VR content) for projection onto the lenses 20 in line draw directions 129 that extend generally cross-wise and outwardly from the midline 90. For example, the first screen 74 may cyclically raster and update AR/VR content (e.g., along a raster line, represented by line 130) in a first direction 132, from a proximate portion 134 (e.g., laterally inward portion) of the first screen 74 (e.g., near the midline 90) toward a distal portion 136 (e.g., laterally-outward portion) of the first screen 74. The second screen 76 may cyclically raster and update AR/VR content (e.g., along an additional raster line, represented by line 138) in a second direction 139, from a proximate portion 141 (e.g., laterally inward portion) of the second screen 76 toward a distal portion 143 (e.g., laterally outward portion) of the second screen 76.

In this manner, the central region 120 of the lens portion 16, which may encompass the foveal vision of the user, may have a lower latency than regions of the lens portion 16 (e.g., the second sections 126, 128) corresponding to regions of the user's peripheral vision. Indeed, the screens 78 may raster updates to the projected AR/VR content onto the first sections 122, 124 of the lenses 20, which may define the user's central field of view, before rastering AR/VR content along the second sections 126, 128 of the lenses 20, which may define the user's peripheral vision. To this end, a user may experience substantially no or unperceivable latency between, for example, the virtual features viewable on the lens portion 16 and features in the real-world environment (e.g., animatronic figures) that may be coordinated with presentation of the virtual features. As a non-limiting example, a time period involved to raster and/or update AR/VR content displayed across the central region 120 of the lens portion 16, using the screens 78, may be approximately four milliseconds, approximately three milliseconds, or less than three milliseconds.

Figure 6:
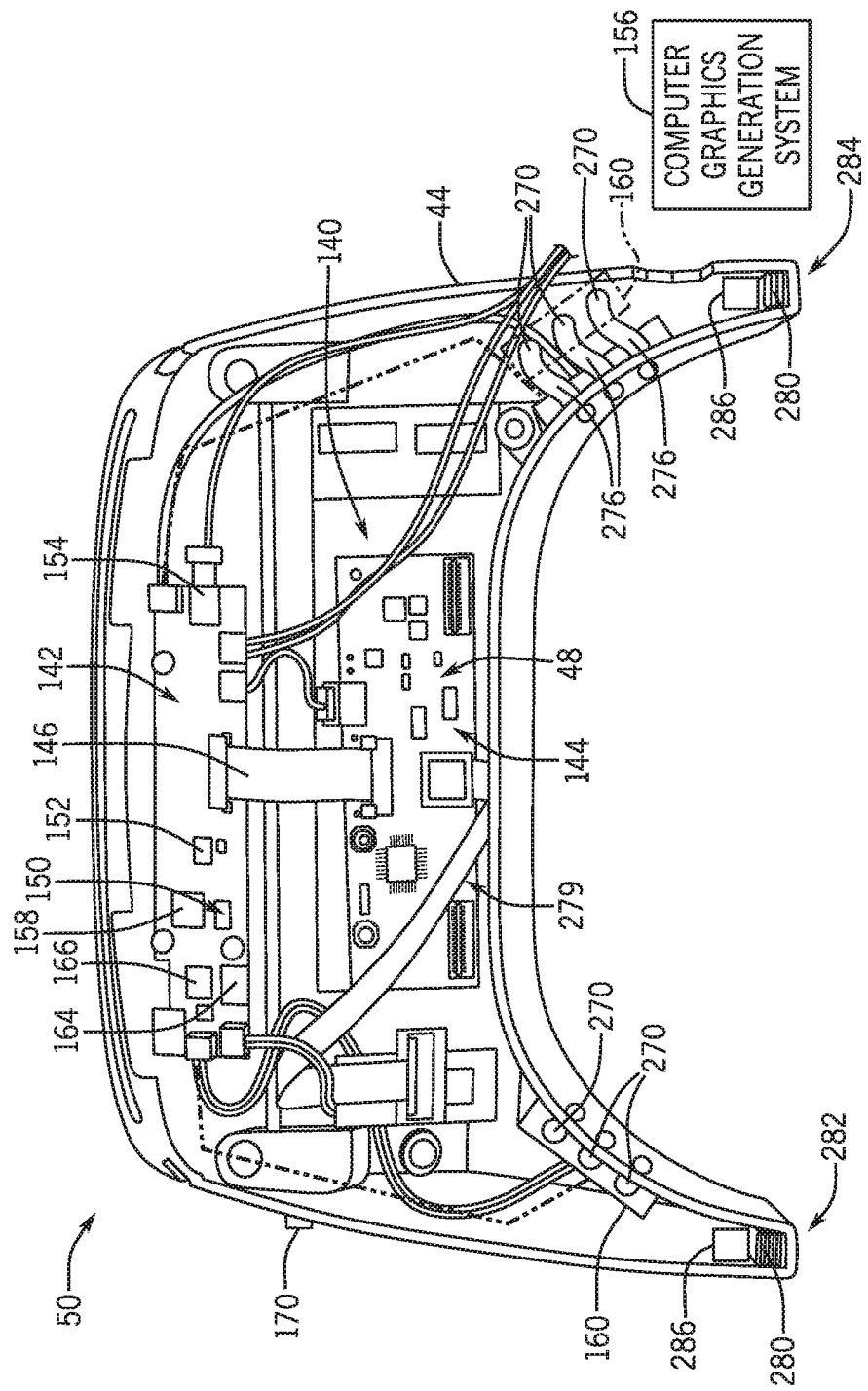
FIG. 6 is a top view of a portion of the wearable visualization device of FIG. 1, in accordance with present embodiments.

FIG. 6 is a top view of an embodiment of a portion of the wearable visualization device 12. In the illustrated embodiment, the lid 42 is removed from the housing 18 to better illustrate the sub-components 48 that may be positioned within the housing 18. As shown in the illustrated embodiment, the wearable visualization device 12 includes a display assembly 140 and an electronics board 142 that may be coupled to the chassis 44 via fasteners, adhesives, and/or other suitable techniques. The display assembly 140 may include the screens 78 and a display driver board 144. The display driver board 144 may be communicatively coupled to the screens 78 and to the electronics board 142 (e.g., via connections 146).

The electronics board 142 may include one or more sensors 150 that facilitate operation of the wearable visualization device 12. As a non-limiting example, the sensors 150 may include orientation and/or position sensors, such as accelerometers, magnetometers, gyroscopes, global positioning system (GPS) receivers, motion tracking sensors, electromagnetic and solid-state motion tracking sensors, one or more inertial measurement units 152 (IMUs), presence sensors, hall-effect sensors temperature sensors, voltmeters, and/or other sensors. In some embodiments, the electronics board 142 may include a communication interface 154 (e.g., including a wired or wireless transceiver) that may transmit real-time data captured via the sensors 150 to a computer graphics generation system 156 that may be located remote of the wearable visualization device 12 (e.g., on a ride vehicle) or integrated with the wearable visualization device 12 (e.g., included on the electronics board 142). In some embodiments, the electronics board 142 may be communicatively coupled to the computer graphics generation system 156 via the cable 32.

The electronics board 142 may include a memory 158 that may store individualized data (e.g., self-test results, error logs, hours of operation, serial number) of the wearable visualization device 12 and/or include instructions that facilitate communication to peripheral sub-assemblies and functions of the wearable visualization device 12 including, for example, a light assembly 160 (e.g., a light emitting diode [LED] assembly), the camera 84, and/or the IMU 152. As discussed below, the light assembly 160 may illuminate to provide various lighting effects in response to user input and/or the occurrence of events. Further, in certain embodiments, the light assembly 160 may, for example, indicate (e.g., via display of a particular color or hue of light) which type (e.g., version) of software is currently running on the electronics board 142.

The display driver board 144 may be configured to decode video signals (e.g., which may be received from the computer graphics generation system 156) and write lines of information to the screens 78. By way of example, the display driver board 144 may generate the raster lines (e.g., the lines 130, 138) to update AR/VR content projected by the screens 78. The display driver board 144 may also optimize a resolution and frequency of video information for display by the screens 78. The display driver board 144 may decode high-definition multimedia interface (HDMI) signals into Mobile Industry Processor Interface (MIPI) Alliance display serial interface (DSI) specifications. As such, it should be understood that the electronics board 142, the display driver board 144, and/or the computer graphics generation system 156 may cooperatively control the screens 78 to provide AR/VR experiences to the user in accordance with the techniques discussed above.

In some embodiments, the electronics board 142 may include an expansion port 164 (e.g., an admin port), which may be communicatively coupled to a processor 166 of the electronics board 142 or to another suitable processing system (e.g., the computer graphics generation system 156). The processor 166 may be a general-purpose processor, system-on-chip (SoC) device, an application-specific integrated circuit (ASIC), or some other similar processor configuration. The expansion port 164 may be coupled to a plug 170 located on an exterior surface of the housing 18. The expansion port 164 may enable auxiliary devices, such as a keyboard and/or mouse, to be communicatively coupled to the electronics board 142. As such, the auxiliary devices may provide a user (e.g., an authorized administrator) with additional functionality and may enable the user to control features of the wearable visualization device 12 using the auxiliary devices. As another non-limiting example, the expansion port 164 may enable integration of Bluetooth® functionality, expanded memory, one or more microphones, one or more acoustic speakers, or any other suitable auxiliary device or devices with the wearable visualization device 12.

Figure 7:
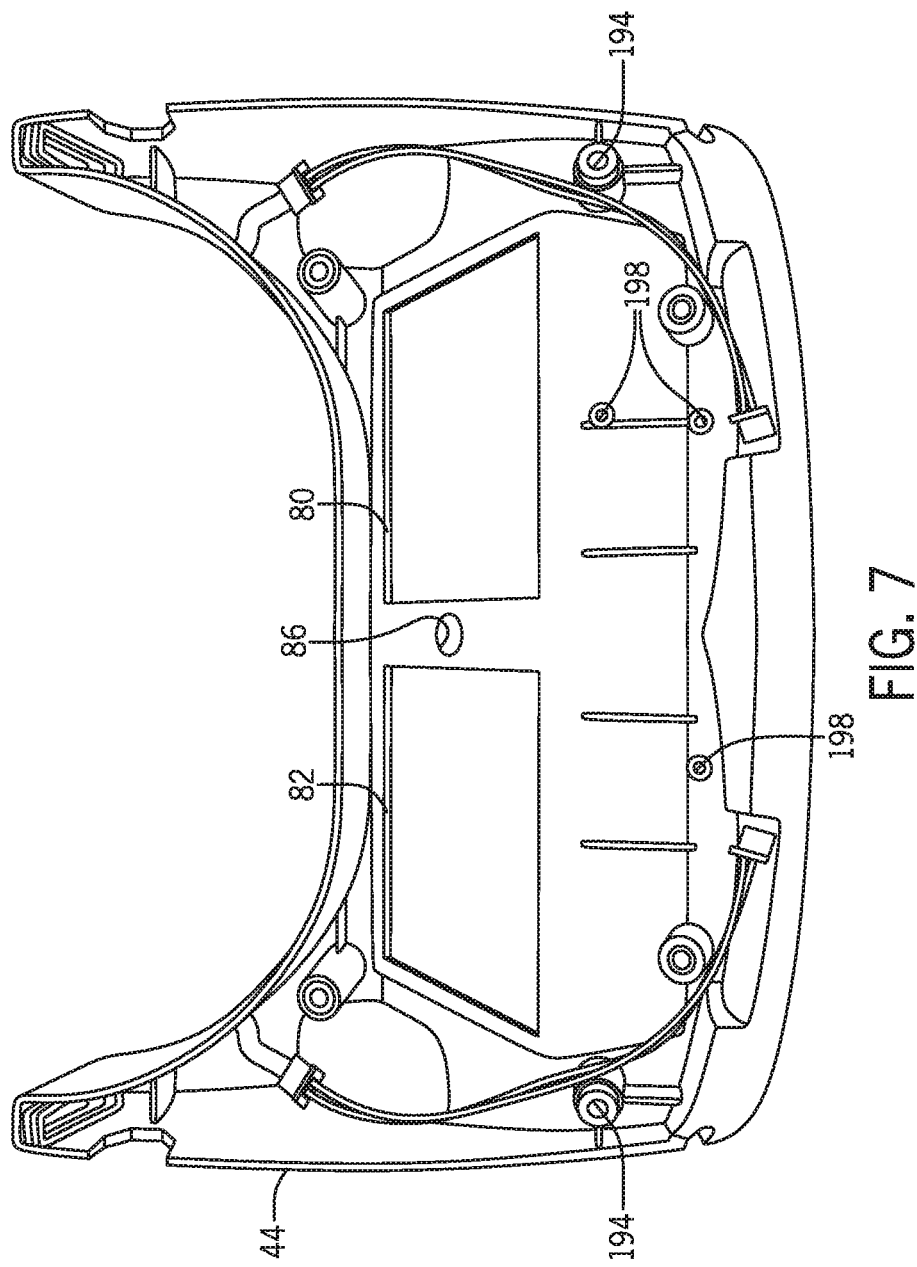
FIG. 7 is a top view of a portion of a housing of the wearable visualization device of FIG. 1, in accordance with present embodiments.
Figure 8:
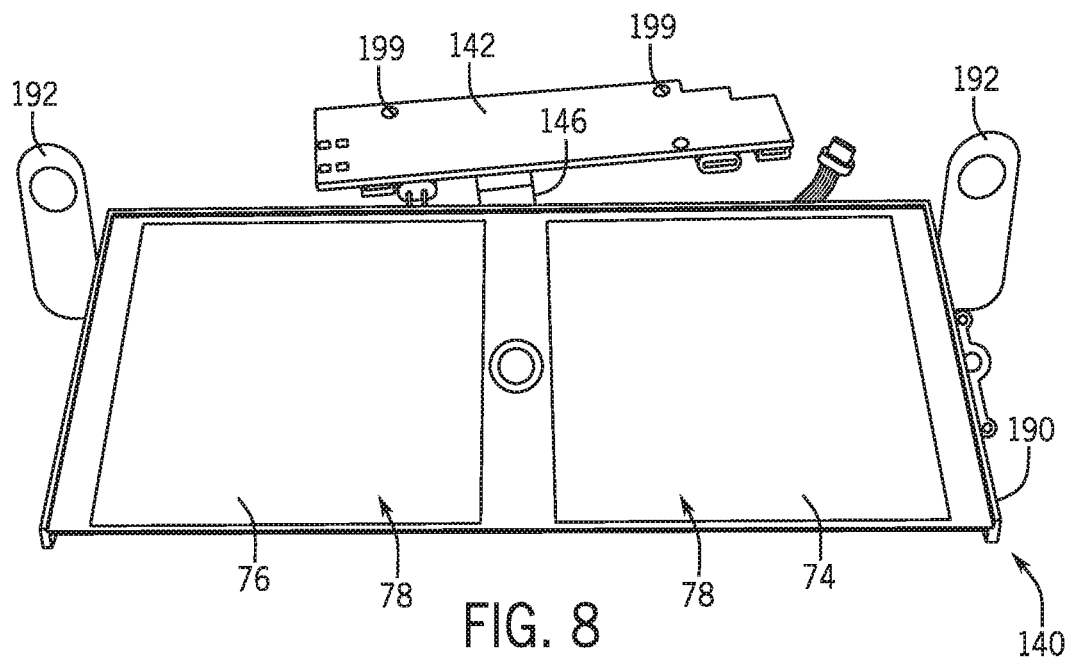
FIG. 8 is a top view of an electronics board and a display assembly that may be used in the wearable visualization device of FIG. 1, in accordance with present embodiments.
Figure 9:
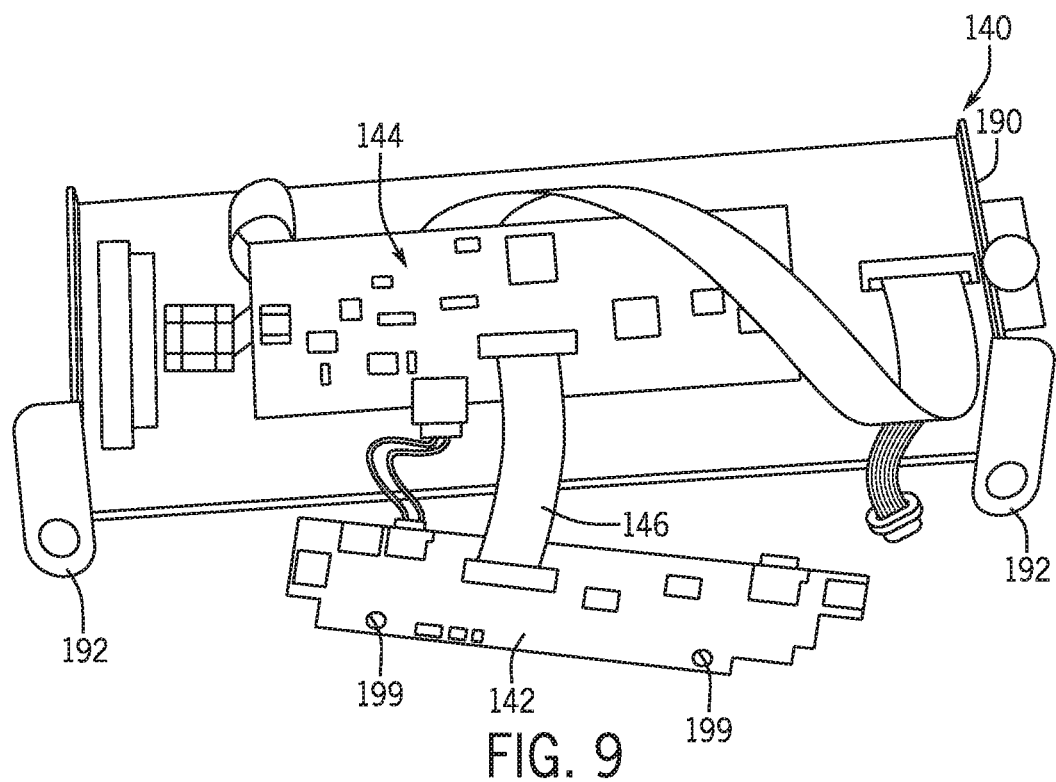
FIG. 9 is a bottom view of the electronics board and the display assembly of FIG. 8, in accordance with present embodiments.

To facilitate maintenance on the wearable visualization device 12, the electronics board 142, the display driver board 144, and/or the screens 78 may each be individually replaceable. For example, to facilitate the following discussion, FIG. 7 is a top view of an embodiment of the chassis 44. FIG. 8 is a top view of an embodiment of the display assembly 140 and the electronics board 142. FIG. 9 is a bottom view of an embodiment of the display assembly 140 and the electronics board 142. FIGS. 7, 8, and 9 will be discussed concurrently below.

The display assembly 140 may include a frame 190 that is configured to support the screens 78, the camera 84, and the display driver board 144. The screens 78, the camera 84, and the display driver board 144 may be coupled to the frame 190 using fasteners, adhesives, and/or other suitable techniques. In some embodiments, the frame 190 may align the camera 84 with respect to the screens 78. That is, the frame 190 may ensure that the camera 84 is placed substantially equidistantly between the first and second screens 74, 76. The frame 190 may include one or more mounting tabs 192 (e.g., component mating features) that are configured to engage with respective mounting prongs 194 (e.g., component mating features) of the chassis 44. To this end, connectors, such as fasteners, adhesives, or other connectors may be used to couple the frame 190 to the chassis 44. The mounting tabs 192 and the mounting prongs 194 may be positioned such that, when the frame 190 is in an engaged configuration with the chassis 44, the first screen 74 is aligned with the first opening 80, the second screen 76 is aligned with the second opening 82, and the camera 84 is aligned with the camera opening 86.

The chassis 44 may include one or more additional mounting prongs 198 (e.g., additional component mating features) that, in some embodiments, may facilitate coupling the electronics board 142 to the chassis 44 via suitable connectors (e.g., fasteners) or adhesives. For example, the electronics board 142 may include one or more apertures 199 (e.g., component mating features) formed therein that are configured to align with the addition mounting prongs 198 (e.g., in an installed configuration of the electronics board 142 within the chassis 44). As such, suitable fasteners and/or adhesives may be used to couple the electronics board 142 to the additional mounting prongs 198. The electronics board 142, the display driver board 144, and/or the screens 78 may be communicatively coupled to one another via the connections 146 (e.g., one or more wired connections and/or optical connections).

The following discussion continues with reference to FIG. 3. As briefly discussed above, the camera 84 may be positioned within the recess 72 and may be configured to acquire image data indicative of reflections viewable on the lens portion 16 (e.g., on the interior surface 97 of the lens portion 16). For example, in some embodiments, the camera 84 may be oriented toward the midline 90, such that the camera 84 may acquire image data of a portion of the first lens 28 and of a portion of the second lens 30. That is, the single camera 84 may acquire image data of both the first and second lenses 28, 30. Particularly, in one embodiment, the camera 84 may acquire image data of the first section 122 of the first lens 28 and of the first section 124 of the second lens 30. In other embodiments, the camera 84 may acquire image data indicative of light reflecting from substantially all of the lens portion 16.

As such, it is important to note that, by positioning the camera 84 between the first and second screens 74, 76, a single camera 84 may be used to acquire image data indicative of light (e.g., virtual features) projected onto the first and second lenses 28, 30 by both the first and second screens 74, 76, respectively. For example, the camera 84 may observe light that is projected onto the first lens 28 by the first screen 74 and is reflected back toward the camera 84 (e.g., via the reflective layer 100 of the first lens 28). Similarly, the camera 84 may observe light that is projected onto the second lens 30 by the second screen 76 and is reflected back toward the camera 84 (e.g., via the reflective layer 100 of the second lens 30).

Additionally or alternatively, the camera 84 may acquire image data of the user's eyes 98 by observing reflections of the user's eyes 98 in the lens portion 16 (e.g., when the wearable visualization system 11, having the wearable visualization device 12 and the interface device 14, is fitted on the head of a user). In some embodiments, the processor 166 (or another suitable component of the electronics board 142) may receive the image data acquired by the camera 84 and utilize the acquired image data to determine biometric information of the user. For example, as discussed below, the processor 166 may utilize the acquired image data of the user's eyes 98 to determine an interpupillary distance of the user (e.g., a distance between respective pupils of the eyes 98 of the user). The processor 166 may utilize the derived biometric information to adjust projection of AR/VR images by the screens 78 in a manner that improves a performance (e.g., a perceived user experience) of the wearable visualization device 12.

Figure 10:
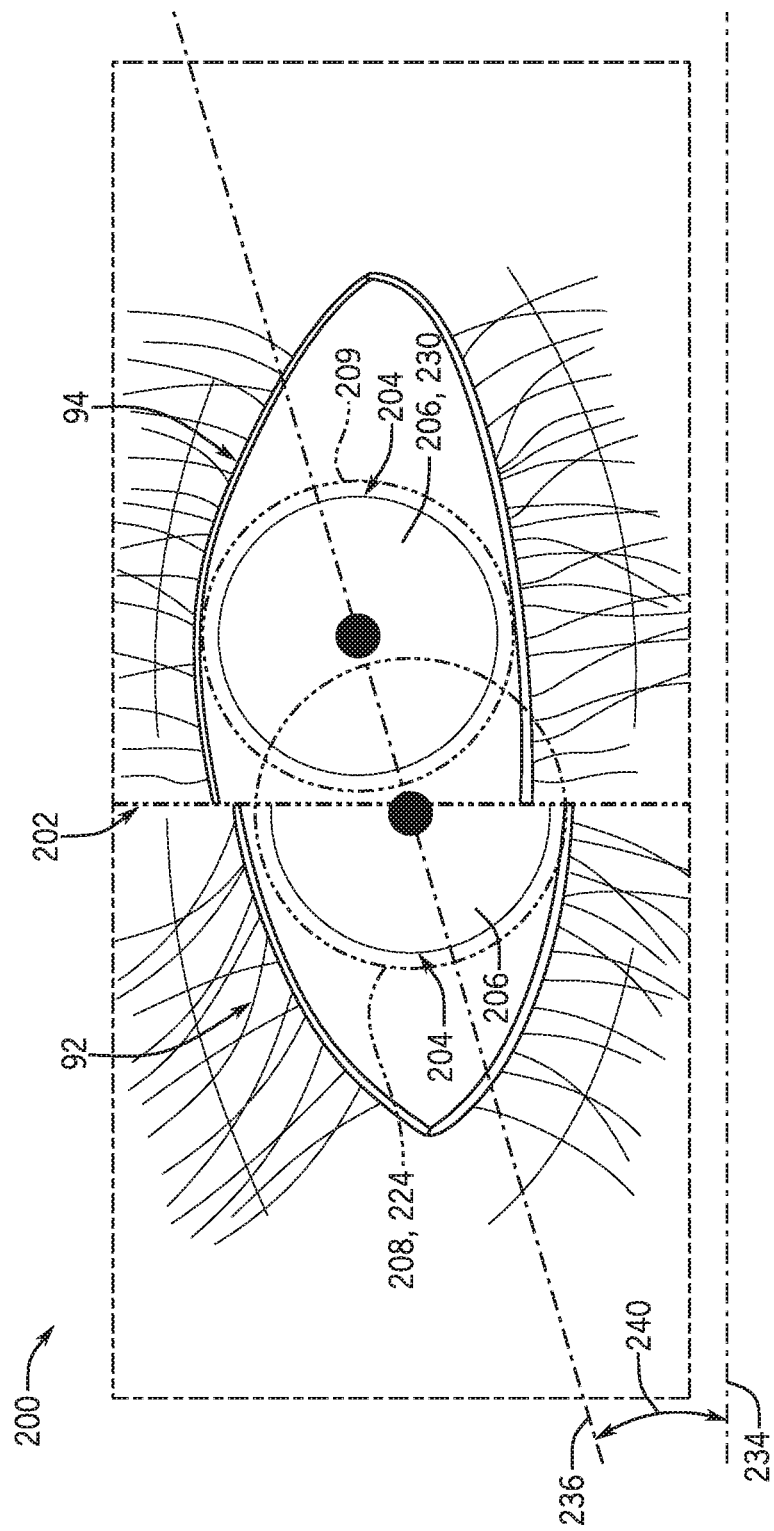
FIG. 10 is a representation of an image that may be acquired by a camera of the wearable visualization device of FIG. 1, in accordance with present embodiments.

For example, to facilitate discussion, FIG. 10 is an embodiment of an image 200 that may be acquired by the camera 84 (e.g., when the wearable visualization system 11 is fitted on the user's head). For clarity, as noted above, the image 200 may correspond to reflections on the interior surface 97 of the lens portion 16 that are observable by the camera 84 (e.g., when the wearable visualization system 11 is fitted on the user's head). As such, it should be understood that a position of the first eye 92 and the second eye 94, as seen in the image 200, are mirrored with respect to an illustrated position of the first eye 92 and the second eye 94 in FIGS. 3 and 5.

As shown in the illustrated embodiment of FIG. 10, the image 200 may include a least a portion of a reflection of the user's first eye 92 (e.g., a left eye of the user, which may be reflected on the first lens 28) and at least a portion of a reflection of the user's second eye 94 (e.g., a right eye of the user, which may be reflected on the second lens 30). The image 200 may include a non-optical area 202 indicative of the midline 90 of the lens portion 16, which, in some embodiments, may not include any reflected features. In certain embodiments, to facilitate acquisition of the image 200, one or both of the screens 78 may be configured to temporarily illuminate (e.g., provide a camera flash) to enhance a reflection of the user's eyes in the lens portion 16.

The camera 84 may be communicatively coupled to the processor 166 and configured to provide the processor 166 with feedback indicative of the image 200. The processor 166 may be configured to analyze the image 200 to detect respective edges 204 of pupils 206 of the user's eyes 98. Based on locations of the edges 204 within the image 200, the processor 166 may estimate a first pupil circumference 208 of the first eye 92 of the user and a second pupil circumference 209 of the second eye 94 of the user. The processor 166 may determine a first centroid of the first pupil circumference 208 and may determine a second centroid of the second pupil circumference 209. As such, the first centroid may be indicative of an estimated centroid of a first pupil of the first eye 92 and the second centroid may be indicative of an estimated centroid of a second pupil of the second eye 94.

Based on the estimated centroids of the pupils 206, the processor 166 may determine an interpupillary distance 210 (see, e.g., FIG. 5) of the user, which may be indicative of a distance between respective centroids of the user's pupils 206. In some embodiments, the processor 166 may be configured to quantify an interpupillary distance 210 of the user. In other embodiments, the processor 166 may be configured to categorize the measured interpupillary distance 210 into one of a plurality of range sets (e.g., small interpupillary distance, medium interpupillary distance, large interpupillary distance).

The following discussion continues with concurrent reference to FIGS. 5 and 10. The processor 166 may be configured to send instructions (e.g., to the electronics board 142; to the display driver board 144) to adjust presentation of the virtual features projected by the screens 78 based on the interpupillary distance 210 of the particular user currently utilizing the wearable visualization system 11. For example, if the processor 166 determines that the interpupillary distance 210 of the user is relatively small (e.g., equal to or less than a first threshold value), the processor 166 may send instructions that cause the screens 78 to project virtual features closer to the midline 90 of the lens portion 16, such that a central region of the virtual features is substantially aligned with (e.g., within a foveal view of) the pupils 206 of the user. Conversely, if the processor 166 determines that the interpupillary distance 210 of the user is relatively large (e.g., above the first threshold value; above a second threshold value that is greater than the first threshold value), the processor 166 may send instruction that cause the screens 78 to project virtual features closer to peripheral edges 205 of the lens portion 16, such that the virtual features are again substantially aligned (e.g., within the foveal view of) with the pupils 206 of the user.

In some embodiments, the processor 166 may be configured to evaluate, based on the image 200, whether the wearable visualization system 11 is appropriately oriented and/or positioned on the user's head. For example, with reference to FIG. 5, when the wearable visualization system 11 is appropriately fitted on the user's head (e.g., not misaligned, offset, or tilted on the user's head), a first distance 220 between a first vertex 222 of the first lens 28 and a centroid of a first pupil 224 of the first eye 92 of the user may be substantially equal to a second distance 226 between a second vertex 228 of the second lens 30 and a centroid of a second pupil 230 of the second eye 94 of the user. As such, it should be understood that, when the wearable visualization system 11 is appropriately fitted on the user's head, a line extending between the first vertex 222 of the first lens 28 and the second vertex 228 of the second lens 30, referred to herein as a reference axis 234 (e.g., a known or predetermined axis, relative the wearable visualization device 12), may extend substantially parallel to an interpupillary axis 236 of the interpupillary distance 210 (e.g., an axis extending between respective centroids of the pupils 206.

With reference to FIG. 10, the processor 166 may determine an angle 240 between the reference axis 234 and the interpupillary axis 236. If the processor 166 determines that a magnitude of the angle 240 between the reference axis 234 and the interpupillary axis 236 is greater than a tolerance value (e.g., 5 degrees), but less than or equal to a first threshold angle value (e.g., 15 degrees), the processor 166 may send instructions (e.g., to the electronics board 142 and/or to the display driver board 144) to adjust presentation of the virtual features projected by the screens 78 based on the angle 240.

For example, if the processor 166 determines (e.g., based on the angle 240) that the first pupil 224 of the first eye 92 is positioned below the second pupil 230 of the second eye 94 (e.g., relative to the reference axis 234), the processor 166 may send instructions that cause the first screen 74 to adjust projection of virtual features closer to a lower portion 250 of the first screen 74, such that the projected virtual features of the first screen 74 are overlaid closer toward a lower portion 252 of the first lens 28. Additionally or alternatively, the processor 166 may send instruction that cause the second screen 76 to adjust projection of virtual features closer to an upper portion 254 of the second screen 76, such that the projected virtual features of the second screen 76 are overlaid closer toward an upper portion 256 of the second lens 30. In this manner, the processor 166 may enable the projected virtual features displayed on the first and second lenses 28, 30 to be substantially aligned with the pupils 206 of the user's first and second eyes 92, 94, respectively, even if the wearable visualization system 11 is slightly offset (e.g., tilted) on the user's head.

Conversely, if the processor 166 determines (e.g., based on the angle 240) that the first pupil 224 of the first eye 92 is positioned above the second pupil 230 of the second eye 94 (e.g., relative to the reference axis 234), the processor 166 may send instructions that cause the first screen 74 to adjust projection of virtual features closer to an upper portion 260 of the first screen 74, such that the projected virtual features of the first screen 74 are overlaid closer toward an upper portion 262 of the first lens 28. Additionally or alternatively, the processor 166 may send instruction that cause the second screen 76 to adjust projection of virtual features closer to a lower portion 264 of the second screen 76, such that the projected virtual features of the second screen 76 are overlaid closer toward a lower portion 266 of the second lens 30. Accordingly, as similarly discussed above the processor 166 may ensure that the projected virtual features displayed on the first and second lenses 28, 30 may be substantially aligned with the pupils 206 of the user's first and second eyes 92, 94, respectively, even if the wearable visualization system 11 is slightly offset (e.g., tilted) on the user's head. In other words, the processor 166 may perform a software fix to correct misalignment of the wearable visualization system 11 on the head of the user.

In some embodiments, if the processor 166 determines that a magnitude of the angle 240 is larger than the first threshold angle value, the processor 166 may generate an alert instructing the user to manually perform a corrective action (e.g., to reposition the wearable visualization system 11 on the user's head). For example, the processor 166 may instruct the screens 78 to project a message onto the lenses 20 that instruct the user to tilt the wearable visualization system 11 in a particular direction (e.g., left, right) on the user's head to cause the interpupillary axis 236 to be adjusted to be substantially parallel to the reference axis 234. Additionally or alternatively, the processor 166 may generate an audible alert (e.g., via an acoustic speaker) that provides a recorded message instructing the user to appropriately reposition the wearable visualization system 11. To this end, the processor 166 may instruct the user to perform a hardware fix to correct misalignment of the AR/VR system 10 on the user's head.

It should be noted that, in certain embodiments, the camera 84 may be positioned at or near the lens portion 16 and configured to directly acquire image data of the user's eyes. That is, in such embodiments, the camera 84 may be oriented toward the eyes 98 to acquire an image of the eyes 98, instead of acquiring an image (e.g., the image 200) of a reflection of the eyes 98 that is viewable on the interior surface 97 of the lens portion 16. Moreover, in certain embodiments, the wearable visualization device 12 may include a first camera configured to acquire image data of reflections viewable in the lens portion 16 and an additional camera directed toward the eyes of the user and configured to directly acquire image data of the user's eyes. In some embodiments, the camera 84 may be used to determine a gaze direction of the user or for determining any other suitable usage information of the user.

As noted above, in some embodiments, the AR/VR system 10 may be utilized in conjunction with an attraction (e.g., a passenger ride system). In such embodiments, the processor 166 may be configured to perform the aforementioned steps (e.g., determining the interpupillary distance 210; determining the angle 240) when the user initially equips the wearable visualization device 12 (e.g., when the user fits the wearable visualization device 12 on the guest interface device 14 fitted on the user's head during boarding of the attraction). By way of example, in such embodiments, the processor 166 may be configured to transmit an alert to a central control system of the attraction upon determining that a magnitude of the angle 240 is greater than, for example, the first threshold angle value. As such, the central control system may provide the alert to an operator (e.g., a ride technician monitoring operation of the attraction), such that the operator may assist the user in appropriately positioning the wearable visualization system 11 on the user's head prior to initiation of a ride cycle of the attraction.

In certain embodiments, the processor 166 may instruct the light assembly 160 to illuminate a particular color based on the magnitude of the angle 240. For example, if the magnitude of the angle 240 is less than or equal to the first threshold angle value, the processor 166 may instruct the light assembly 160 to illuminate in a green color or hue, thereby signaling to the user and/or the ride operator that the wearable visualization system 11 is appropriately fitted (e.g., aligned) on the user's head. As noted above, in such instances, the processor 166 may compensate for any minor misalignment of the wearable visualization system 11 on the user's head by performing a software fix (e.g., by adjusting presentation of the virtual features by the screens 78). If the magnitude of the angle 240 is greater than the first threshold angle value, the processor 166 may instruct the light assembly 160 to illuminate in, for example, a red color or hue, thereby signaling to the user and/or the ride operator that repositioning of the wearable visualization system 11 on the user's head may be desired.

Figure 11:
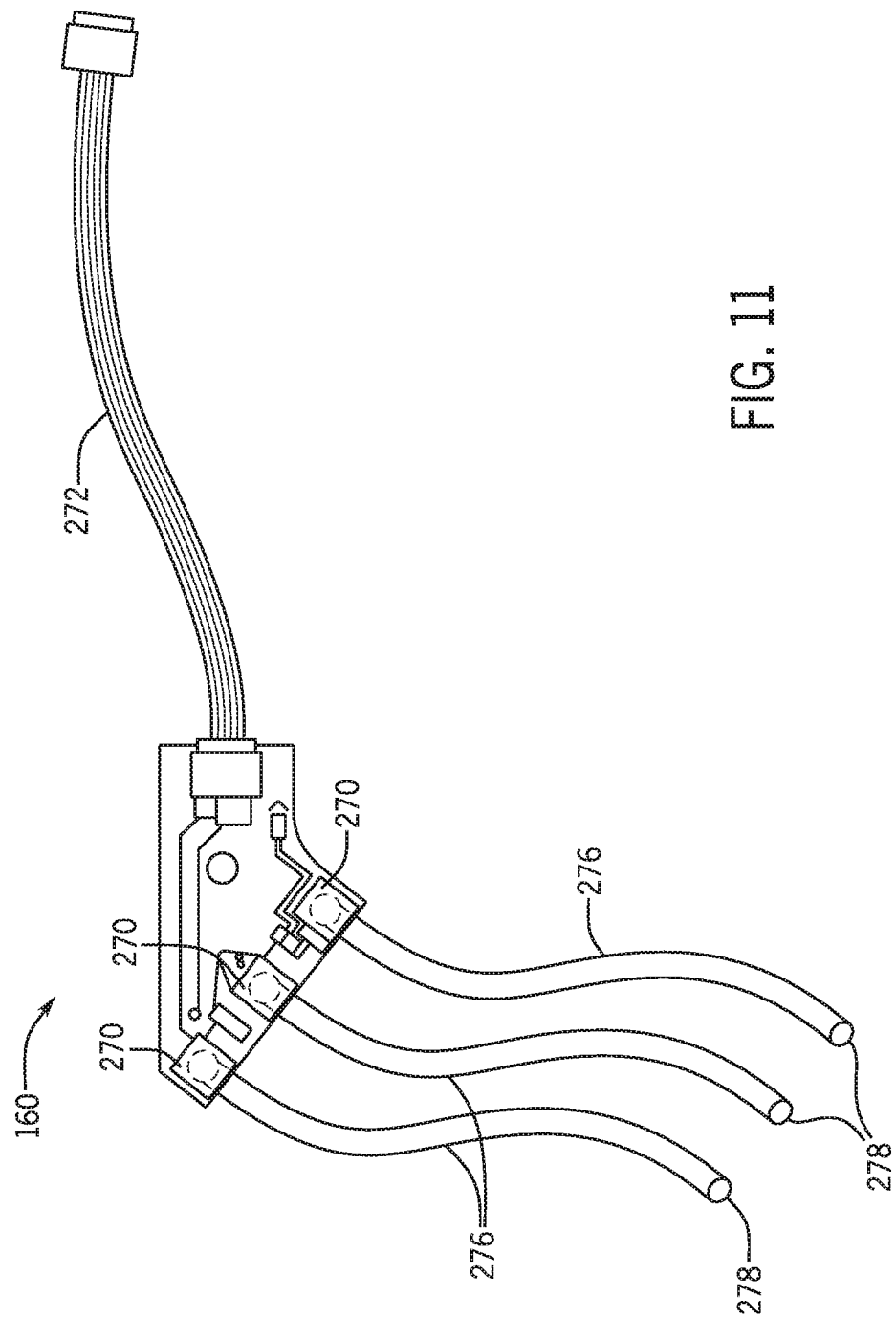
FIG. 11 is a top view of a light assembly that may be used in the wearable visualization device of FIG. 1, in accordance with present embodiments.

FIG. 11 is a top view of an embodiment of the light assembly 160. FIGS. 3 and 11 will be discussed concurrently below. The light assembly 160 may include one or more LEDs 270 or other lighting elements that may be electrically and/or communicatively coupled to the electronics board 142 via a tether 272 (e.g., a wired connection). In some embodiments, the light assembly 160 may be coupled to the chassis 44 and positioned near an inner surface 274 of the chassis 44. In such embodiments, the LEDs 270 may be positioned within respective lighting apertures formed in the chassis 44, such that the LEDs 270 may project light through the lighting apertures and toward the user (e.g., inwardly), away from the user (e.g., outwardly), toward the lens portion 16, or in any suitable direction.

In certain embodiments, one or more of the LEDs 270 may be coupled to respective light pipes 276 (e.g., optical fibers; acrylic rods) that are configured to transmit light emitted by the LEDs 270 from respective first end portions coupled to the LEDs 270 to respective distal end portions 278. As such, the light pipes 276 may enable the LEDs 270 to be positioned within, for example, a central region 279 (see, e.g., FIG. 6) of the housing 18, while still being operable to project light through the lighting apertures of the chassis 44. For example, the light pipes 276 may extend between the LEDs 270 and the lighting apertures formed within an exterior surface of the chassis 44, such that light emitted by the LEDs 270 may be transferred from the LEDs 270 (e.g., which may be positioned in the central region 279) toward the lighting apertures and emitted from the lighting apertures. As such, it should be appreciated that the light pipes 276 may enable the LEDs 270 to be positioned at any suitable location within the housing 18.

The following discussion continues with reference to FIG. 6. In some embodiments, the wearable visualization device 12 may include one or more primary magnets 280 that may be coupled to the chassis 44 near first and second peripheral portions 282, 284 of the chassis 44. As discussed in detail below, the primary magnets 280 may facilitate removably coupling the wearable visualization device 12 to the guest interface device 14. In some embodiments, the primary magnets 280 may be removably coupled to the chassis 44 via retention clips 286. As such, removal of the retention clips 286 from the chassis 44 may permit replacement of the primary magnets 280, such as when the primary magnets 280 are worn (e.g., when a magnetic strength of the primary magnets 280 falls below a threshold value). For example, to remove the primary magnets 280 from the chassis 44, an operator (e.g., a service technician) may first remove the lid 42 from the chassis 44, remove the retention clips 286 from the chassis 44, and subsequently remove the primary magnets 280 from the chassis 44. To reinstall new magnets in place of the primary magnets 280, the operator may insert replacement magnets at the appropriate locations in the chassis 44 and perform the aforementioned steps in reverse order.

Figure 12:
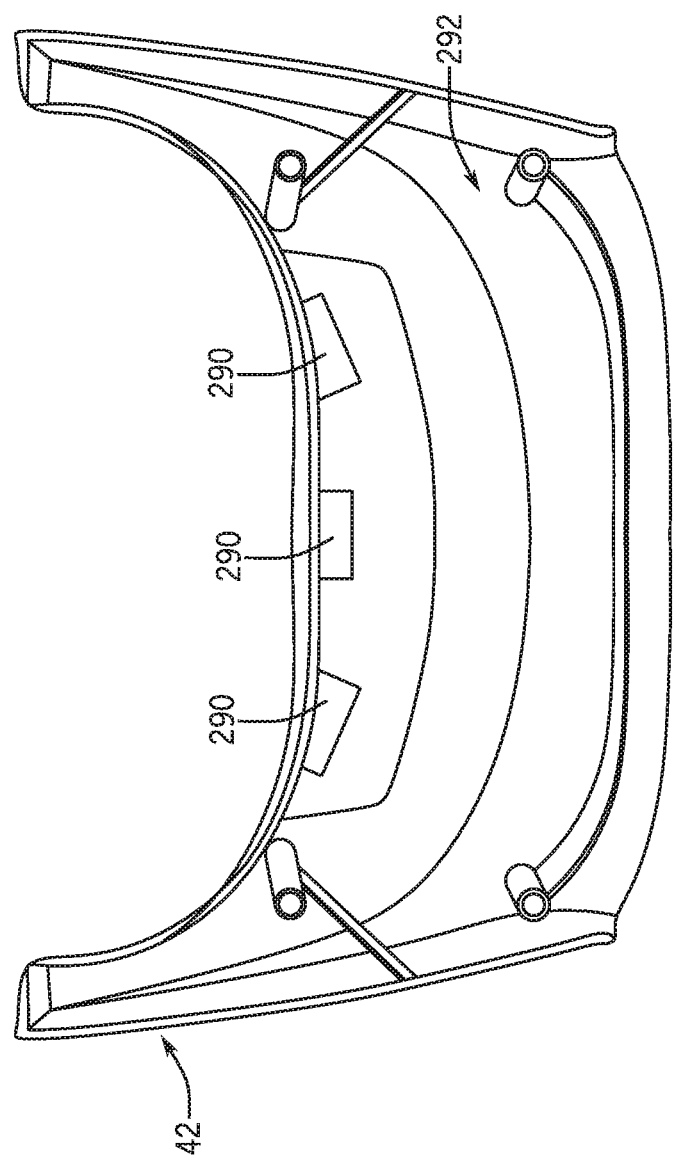
FIG. 12 is a bottom view of a portion of a housing of the wearable visualization device of FIG. 1, in accordance with present embodiments.

FIG. 12 is a bottom view of an embodiment of the lid 42. In some embodiments, the lid 42 may include one or more secondary magnets 290 that are coupled to an inner surface 292 of the lid 42 (e.g., via fasteners, via suitable adhesives). As discussed below, the secondary magnets 290 may be used in addition to, or in lieu of, the primary magnets 280 to facilitate removably coupling the wearable visualization device 12 to the guest interface device 14. Although three secondary magnets 290 are shown in the illustrated embodiment of FIG. 12, it should be appreciated that, in other embodiments, any suitable quantity of secondary magnets 290 may be coupled to the lid 42.

Figure 13:
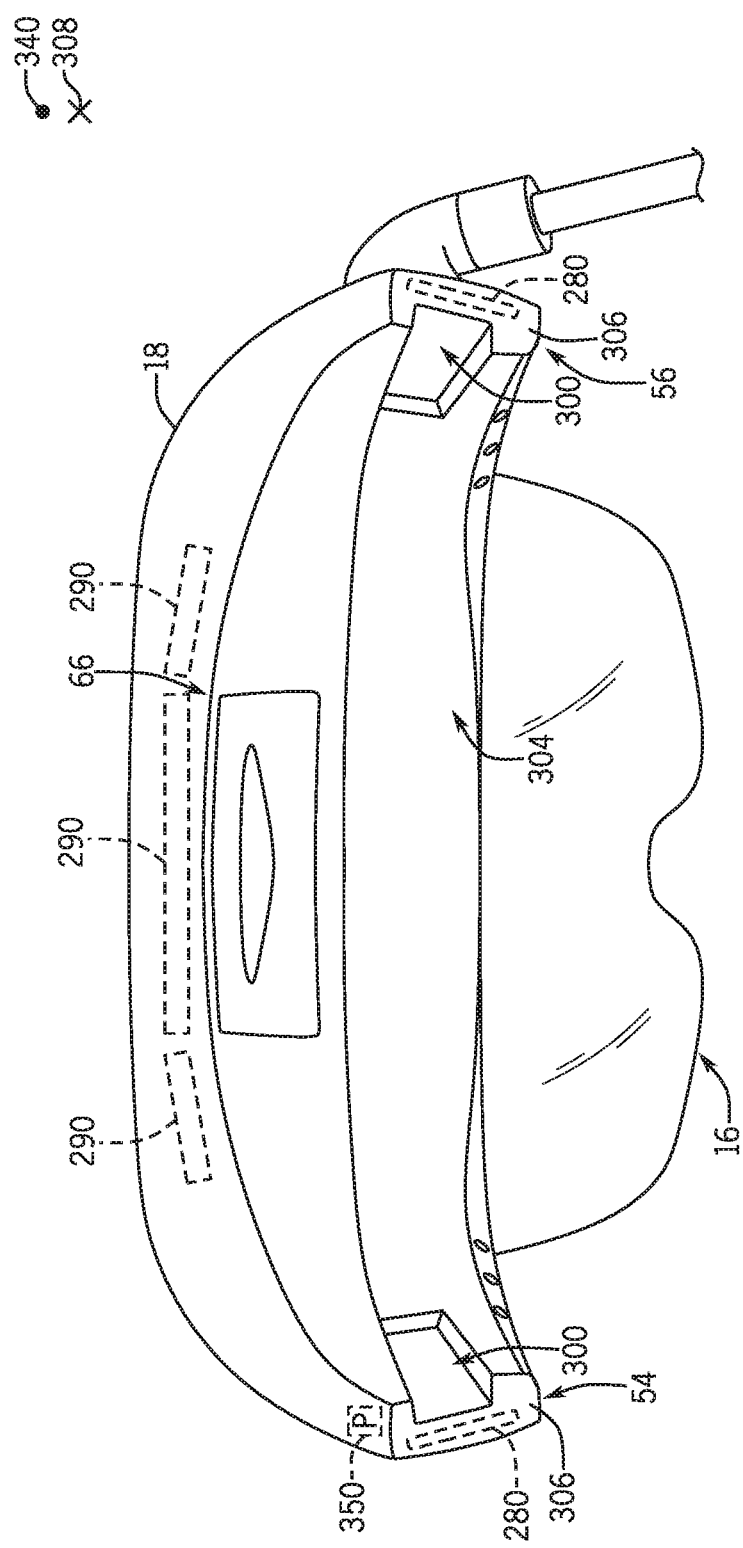
FIG. 13 is a rear view of the wearable visualization device of FIG. 1, in accordance with present embodiments.
Figure 14:
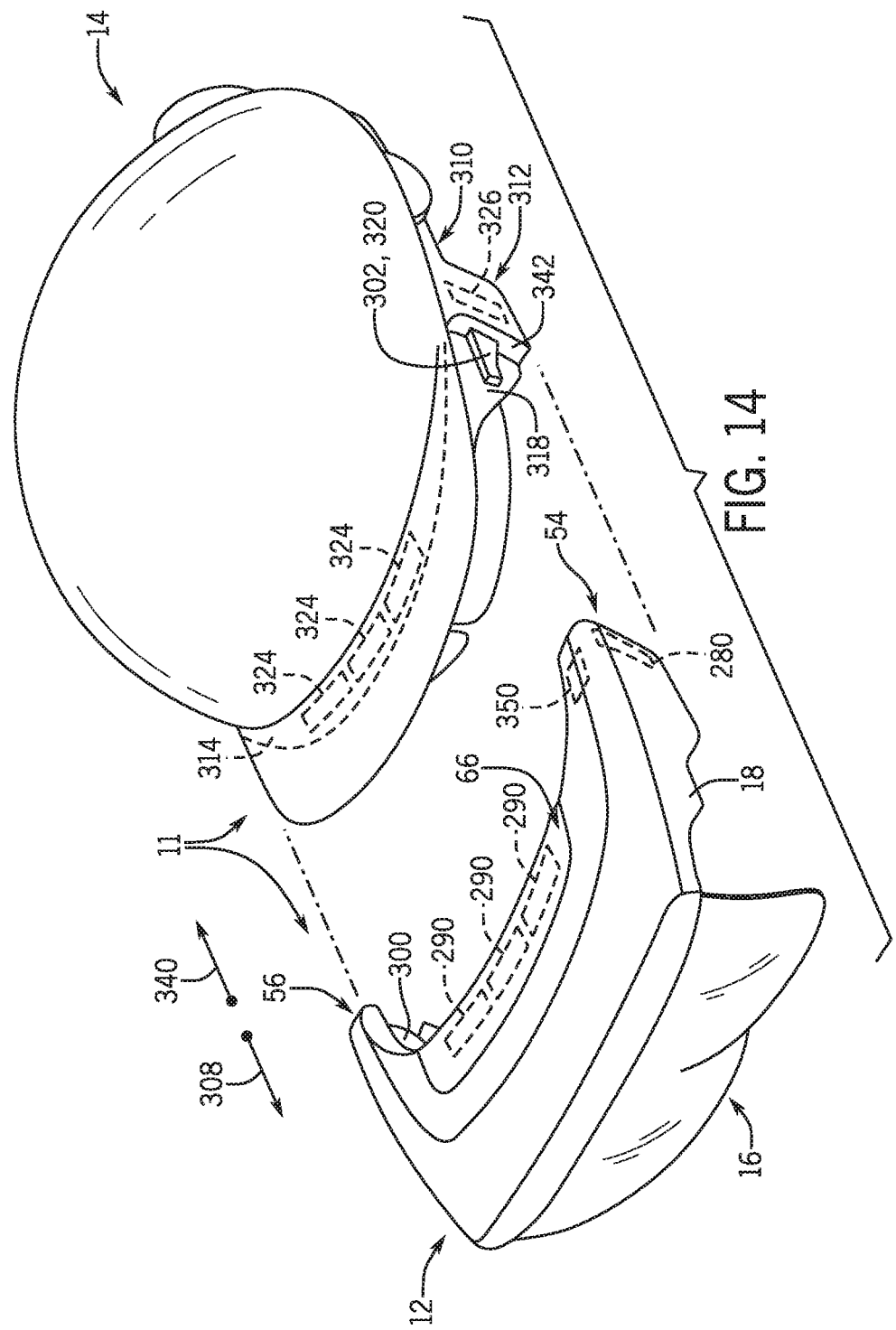
FIG. 14 is a perspective view of an interface device and a wearable visualization device of an AR/VR system in a detached configuration, in accordance with present embodiments.

FIG. 13 is a rear view of an embodiment of the wearable visualization device 12. FIG. 14 is a perspective view of an embodiment of the wearable visualization device 12 and the guest interface device 14. FIGS. 13 and 14 will be discussed concurrently below. Furthermore, it should be noted that FIG. 14 illustrates a different structure for the guest interface device 14 (e.g., a helmet, compared to a visor of FIG. 14), as various different structures for the guest interface device 14 are envisioned.

The wearable visualization device 12 may include a plurality of support grooves 300 that are configured to engage with respective support ribs 302 of the guest interface device 14. In some embodiments, the support grooves 300 are formed within the first and second peripheral portions 54, 56 of the housing 18 and extend along at least a portion of a surface 304 of the housing 18. For example, the support grooves 300 may extend from distal end faces 306 of the housing 18 generally along a direction 308.

The guest interface device 14 includes an interface frame 310 having a first peripheral end 312, a second peripheral end opposite to the first peripheral end 312, and a lip 314 that extends between the first peripheral end 312 and the second peripheral end. The interface frame 310 includes the plurality of support ribs 302 that protrude from an outer surface 318 of the interface frame 310. Particularly, the interface frame 310 may include a first support rib 320 that extends from the first peripheral end 312 and a second support rib that extends from the second peripheral end. As discussed below, the support ribs 302 are configured to engage with corresponding ones of the support grooves 300 to support the wearable visualization device 12 on the interface frame 310 and to facilitate coupling of the wearable visualization device 12 to the interface frame 310.

The interface frame 310 may include one or more tertiary magnets 324 that are coupled to and/or integrated with (e.g., hermetically sealed within) the interface frame 310 (e.g., within the lip 314). Further, the interface frame 310 may include a one or more quaternary magnets 326 that are coupled to and/or integrated with (e.g., hermetically sealed within) the first peripheral end 312 and/or the second peripheral end of the interface frame 310.

To couple the wearable visualization device 12 to the guest interface device 14, the user may (e.g., while holding the guest interface device 14 in the user's hands and while the guest interface device 14 is separated from the user's head; while wearing the guest interface device 14 on the user's head) translate the wearable visualization device 12 toward the guest interface device 14 in a direction 340, generally opposite to the direction 308, to enable the support ribs 302 of the guest interface device 14 to engage with the corresponding support grooves 300 of the wearable visualization device 12. The user may translate the wearable visualization device 12 along the support ribs 302 (e.g., in the direction 340) until the distal end faces 306 of the housing 18 abut corresponding receiving faces 342 of the guest interface device 14. As such, the primary magnets 280 of the wearable visualization device may align with and magnetically couple to the quaternary magnets 326 of the guest interface device 14.

At least a portion of the lid 42 of the wearable visualization device 12 may be configured to translate beneath and along the lip 314 of the guest interface device 14 to enable the secondary magnets 290 of the wearable visualization device 12 to engage with and magnetically couple to the tertiary magnets 324 of the guest interface device 14. To this end, the mechanical engagement between the support ribs 302 and the support grooves 300 may support substantially all of a weight of the wearable visualization device 12 (e.g., when coupled to the guest interface device 14), while the magnetic engagement between the primary and quaternary magnets 280, 326 and/or the secondary and tertiary magnets 290, 324 blocks the wearable visualization device 12 from disengaging (e.g., sliding off of) the guest interface device 14. Indeed, it should be understood that a force utilized to magnetically decouple the primary and quaternary magnets 280, 326 and/or to magnetically decouple the secondary and tertiary magnets 290, 324, such as when transitioning the wearable visualization device 12 from the engaged configuration 34 (e.g., as shown in FIG. 1) to the detached configuration 36, may be greater than, for example, a force acting on the wearable visualization device 12 due to gravity, due to shaking or turning of the user's head, or due to other inadvertent contact with the wearable visualization device 12. Accordingly, the magnets 280, 290, 324, and 326, in conjunction with the support ribs 302 and the support grooves 300, may be configured to retain the wearable visualization device 12 in the engaged configuration 34 on the guest interface device 14 until the user manually removes the wearable visualization device 12 from the guest interface device 14.

To remove the wearable visualization device 12 from the guest interface device 14, the user may translate the wearable visualization device 12 away from the guest interface device 14 in the direction 308, generally opposite to the direction 340, to enable the primary magnets 280 of the wearable visualization device 12 to magnetically decouple from the quaternary magnets 326 of the guest interface device 14 and/or to enable the secondary magnets 290 of the wearable visualization device 12 to magnetically decouple from the tertiary magnets 324 of the wearable visualization device 12. The user may continue to translate the wearable visualization device 12 in the direction 308, relative to the guest interface device 14, to remove (e.g., decouple) the wearable visualization device 12 from the guest interface device 14.

It should be appreciated that, in certain embodiments, the primary magnets 280 or the quaternary magnets 326, and/or the secondary magnets 290 or the tertiary magnets 324, may be replaced with a suitable reaction material (e.g., metallic plates). As such, the magnets 280, 290, 324, and/or 326 may be configured to attract a corresponding reaction material instead of another magnet. Moreover, in certain embodiments, any of the magnets 280, 290, 324, and/or 326 may be replaced with suitable electromagnets that are powered via a wired or wireless power source (e.g., a battery). In such cases, the electromagnets may be deactivated to enable separation of the wearable visualization device 12 from the guest interface device 14 at certain times, such as during an unloading process in which the user is unloading from the ride vehicle of the amusement park ride. Similarly, the electromagnets may be activated to facilitate securement of the wearable visualization device 12 to the guest interface device 14 at certain times, such as during a loading process in which the user is loading onto the ride vehicle of the amusement park ride. The deactivation and activation may be carried out automatically by the AR/VR system 10 based on the location of the wearable visualization device 12.

It should be noted that the magnets 280, 290, 324, and/or 326 are described herein as primary magnets, secondary magnets, tertiary magnets, and quaternary magnets, respectively, to facilitate discussion. However, other terms may be used to refer to the magnets 280, 290, 324, 326 (e.g., first magnets, second magnets, third magnets, and fourth magnets, respectively). Moreover, in certain embodiments, the primary magnets 280 or the quaternary magnets 324, and/or the secondary magnets 290 or the tertiary magnets 324, may be omitted from the AR/VR system 10.

In some embodiments, the wearable visualization device 12 may include a proximity sensor 350 (e.g., a Hall effect sensor) that is coupled to the housing 18 and located near, for example, the first peripheral portion 54 of the housing 18. Particularly, the proximity sensor 350 may be positioned near the distal end face 306 of the housing 18. The proximity sensor 350 may be communicatively coupled to the electronics board 142 and configured to provide the processor 166 (or another suitable processing component) with feedback indicative of whether the wearable visualization device 12 is in the engaged configuration 34 (e.g., mated with the guest interface device 14) or in the disengaged configuration 36 (e.g., detached from the guest interface device 14). Particularly, the proximity sensor 350 may be triggered (e.g., generate a signal) when the wearable visualization device 12 is within a threshold distance of the guest interface device 14 and, thus, may be used to determine when the wearable visualization device 12 is positioned in the engaged configuration 34. By way of example, the proximity sensor 350 may be triggered when the distal end face 306 of the first peripheral portion 54 of the wearable visualization device 12 is within a threshold distance of or in contact with the receiving face 342 of the first peripheral end 312 of the interface frame 310.

In some embodiments, the processor 166 may periodically or continuously monitor the feedback received from the proximity sensor 350. Upon receiving feedback from the proximity sensor 350 indicating that the wearable visualization device 12 in the engaged configuration 34, the processor 166 may provide an indication to the user confirming that the wearable visualization device 12 has been successfully mated with the guest interface device 14. By way of example, upon receiving feedback indicating that the wearable visualization device 12 is in the engaged configuration 34, the processor 166 may instruct the light assembly 160 to project a particular hue or color of light (e.g., green), may control one or more acoustic speakers of the wearable visualization device 12 to provide an audible message to the user, may control the screens 78 to display a message to the user on the lenses 20, and/or may provide feedback to the user and/or to an operator via another suitable medium.

It should understood that, in other embodiments, the wearable visualization device 12 may include a plurality of proximity sensors that are positioned along any suitable portion of the wearable visualization device 12. For example, the wearable visualization device 12 may include a first proximity sensor positioned within the first peripheral portion 54 of the housing 18 and a second proximity sensor positioned within the second peripheral portion 56 of the housing 18. In such embodiments, the processor 166 may determine that the wearable visualization device 12 is coupled to the guest interface device 14 upon receiving feedback that both the first and second proximity sensors are triggered. Indeed, in certain embodiments, the processor 166 may determine that the wearable visualization device 12 is coupled to the guest interface device 14 upon receiving feedback that any one particular proximity sensor is triggered or that a threshold quantity of the proximity sensors included in the wearable visualization 12 device are triggered.

Figure 15:
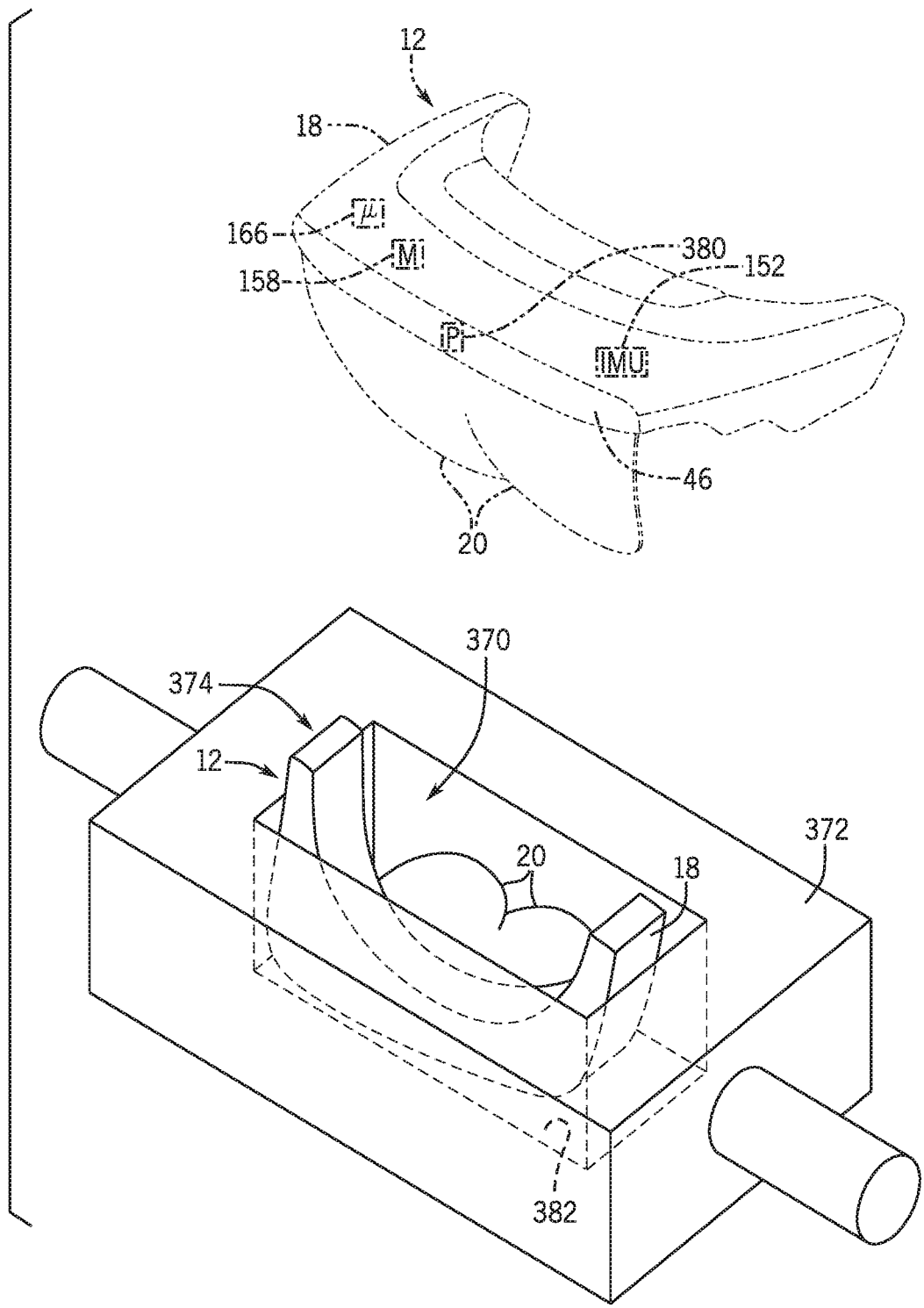
FIG. 15 is a perspective view of a storage receptacle and the wearable visualization device of FIG. 1 in a storage configuration, in accordance with present embodiments.

FIG. 15 is a perspective view of an embodiment of the wearable visualization device 12 and a receptacle 370 configured to receive the wearable visualization device 12. In some embodiments, the wearable visualization device 12 may be stored in the receptacle 370 when the wearable visualization device 12 is not fitted on the guest interface device 14 of a user. By way of example, the receptacle 370 may include a cavity or other storage region formed within a lap bar 372 of a ride vehicle. In some embodiments, the processor 166 may be configured to utilize feedback from the proximity sensor 350 and/or the IMU 152 (e.g., an orientation sensor) to determine whether the wearable visualization device 12 is in a storage configuration 374 within in the receptacle 370.

For example, the IMU 152 may include a nine degree of freedom system on a chip equipped with accelerometers, gyroscopes, a magnetometer, and/or a processor for executing sensor fusion algorithms. The processor 166 may utilize feedback received from the IMU 152 to determine an orientation of the wearable visualization device 12 (e.g., relative to a direction of gravity) along various axes. In some embodiments, an orientation, referred to herein as a storage orientation, of the wearable visualization device 12, when the wearable visualization device 12 is positioned in the receptacle 370, may be known and stored on, for example, the memory 158.

The processor 166 may determine that the wearable visualization device 12 is in the storage configuration 374 upon receiving feedback from the IMU 152 that the wearable visualization device 12 is in the storage orientation and upon receiving feedback from a proximity sensor 380 (e.g., a proximity sensor disposed adjacent to the lens mount 46; the proximity sensor 350) that, for example, the lens mount 46 is a threshold distance away from a mating surface 382 of the receptacle 370 or in contact with the mating surface 382. The processor 166 may not inadvertently determine that the wearable visualization device 12 is in the storage configuration 374 when a user temporarily orients the wearable visualization device 12 in the storage orientation (e.g., such as during the process of mating the wearable visualization device 12 to the guest interface device 14). Instead, the processor 166 may determine that the wearable visualization device 12 is positioned in the in the storage configuration 374 when receiving feedback from both the IMU 152 and the proximity sensor 350 indicating that the wearable visualization device 12 is positioned within the receptacle 370 at a particular angle and is engaged with (e.g., in physical contact with) the mating surface 382. In accordance with the techniques discussed above, the processor 116 may be configured to provide an audible and/or visual alert or confirmation upon determining that the wearable visualization device 12 is transitioned to the storage configuration 374. As an example, upon determining that the wearable visualization device 12 transitioned to the storage configuration 374, the processor 166 may instruct the light assembly 160 to emit a blue color or other hue of light.

In some embodiments, the lap bar 372 may move (e.g., release) in response to the wearable visualization device 12 being in the storage configuration 374. It should be appreciated that the receptacle 370 may be positioned in any suitable portion of the ride vehicle (e.g., dashboard, arm rest, wall). The receptacle 370 may be used in other types of attractions (e.g., without a ride vehicle), and the receptacle 370 may be positioned in a wall or structure, such as in a seat or at an exit of the attraction.

As set forth above, embodiments of the present disclosure may provide one or more technical effects useful for reducing overall manufacturing costs and/or manufacturing complexity of the wearable visualization device, for facilitating performance of maintenance activities on the wearable visualization device, and for facilitating integration of the wearable visualization device in an amusement park environment. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wearable visualization device configured to provide a user with an augmented reality, a virtual reality, and/or a mixed reality experience, the wearable visualization device comprising:
    a housing;
    a lens portion extending from the housing;
    a first display screen and a second display screen coupled to the housing and oriented toward the lens portion, wherein the first display screen and the second display screen are configured to project light onto the lens portion, wherein the lens portion is configured to reflect at least a portion of the light toward eyes of the user; and
    a camera positioned between the first display screen and the second display screen and oriented toward the lens portion, wherein the camera is configured to acquire image data of the lens portion, wherein the image data comprises the portion of the light projected onto the lens portion by the first display screen and the second display screen and a reflection of the eyes of the user reflected by the lens portion.

2. The wearable visualization device of claim 1, comprising a processor communicatively coupled to the camera, wherein the processor is configured to receive the image data and determine biometric information of the user based on the reflection of the eyes.

3. The wearable visualization device of claim 2, wherein the biometric information comprises an interpupillary distance of the user.

4. The wearable visualization device of claim 2, wherein the processor is configured to control the first display screen and the second display screen to adjust projection of the light onto the lens portion based on the biometric information.

5. The wearable visualization device of claim 1, wherein the first display screen and the second display screen are spaced substantially equidistantly from a centerline of the wearable visualization device, wherein the first display screen is configured to raster virtual features onto the lens portion in a first direction extending outwardly from and crosswise to the centerline and the second display screen is configured to raster additional virtual features onto the lens portion in a second direction extending outwardly from and crosswise to the centerline.

6. The wearable visualization device of claim 1, wherein the lens portion comprises an interior surface oriented toward the first display screen and the second display screen, wherein the interior surface is coated with a reflective layer configured to reflect between 50 percent and 70 percent of the light projected onto the lens portion into the eyes of the user.

7. The wearable visualization device of claim 6, wherein the lens portion comprises an exterior surface opposite the interior surface, wherein the exterior surface is coated with an anti-reflective layer, a scratch resistant coating, or both.

8. An augmented reality, virtual reality, and/or mixed reality (AR/VR) system, comprising:
    a wearable visualization device, comprising:
        a housing;
        a lens portion extending from the housing and configured to extend across a line of sight of a user while the wearable visualization device is in an equipped configuration on the user; and
        a display assembly having a frame removably coupled to the housing, wherein a first display screen, a second display screen, and a camera are coupled to the frame, wherein the first display screen and the second display screen are configured to project light onto a surface of the lens portion, wherein the camera is positioned between the first display screen and the second display screen and oriented toward the surface of the lens portion, and wherein the first display screen and the second display screen are removed from the line of sight of the user while the wearable visualization device is in the equipped configuration on the user.

9. The AR/VR system of claim 8, wherein the housing comprises a chassis having a first screen opening, a second screen opening, and a camera opening, wherein the frame is configured to removably couple to the chassis, and, in an engaged configuration with the chassis, is configured to align the first display screen, the second display screen, and the camera with the first screen opening, the second screen opening, and the camera opening, respectively.

10. The AR/VR system of claim 8, comprising a light emitting diode (LED) disposed within an interior of the housing and a light pipe extending between the LED and an exterior surface of the housing.

11. The AR/VR system of claim 8, comprising an interface device configured to couple to a head of the user, wherein the wearable visualization device is configured to removably couple to the interface device.

12. The AR/VR system of claim 11, comprising:
- a proximity sensor coupled to the housing and configured to provide feedback indicative of a proximity of the housing with respect to a surface of the interface device; and
- a processor communicatively coupled to the proximity sensor, wherein the processor is configured to determine, based on the feedback, whether the wearable visualization device is coupled to the interface device.

13. The AR/VR system of claim 12, wherein the processor is configured to instruct illumination of a lighting element of the wearable visualization device upon a determination that the wearable visualization device is coupled to the interface device.

14. A wearable visualization device configured to provide a user with an augmented reality, a virtual reality, and/or a mixed reality experience, the wearable visualization device comprising:
- a lens portion;
- a display screen oriented toward a surface of the lens portion and configured to project virtual features onto a first location of the surface;
- a camera oriented toward the surface of the lens portion and configured to acquire image data indicative of reflections that are reflected by the surface of the lens portion, wherein the reflections comprise a first reflection of a first eye of the user and a second reflection of a second eye of the user; and
- a processor communicatively coupled to the camera and the display screen, wherein the processor is configured to adjust projection of the virtual features from the first location to a second location on the surface of the lens portion based on the image data.

15. The wearable visualization device of claim 14, wherein, based on the image data, the processor is configured to:
- determine an interpupillary axis extending between a first pupil of the first eye of the user and a second pupil of the second eye of the user; and
- determine an angle between the interpupillary axis and a reference axis extending along the lens portion, wherein the angle is indicative of an orientation of the wearable visualization device with respect to a head of the user.

16. The wearable visualization device of claim 15, wherein the processor is configured to instruct the display screen to project the virtual features onto the second location of the surface of the lens portion upon a determination that the angle is greater than a tolerance value.

17. The wearable visualization device of claim 16, wherein the processor is configured to generate an alert indicating that the wearable visualization device is misaligned on the head of the user upon a determination that the angle exceeds a threshold value greater than the tolerance value.

18. The wearable visualization device of claim 14, comprising:
- a proximity sensor configured to monitor a proximity of the wearable visualization device with respect to a surface; and
- an orientation sensor configured to monitor an orientation of the wearable visualization device with respect to gravity, wherein the processor is configured to determine that the wearable visualization device is in a storage configuration upon receiving feedback from the proximity sensor indicating that the wearable visualization device is within a threshold distance of the surface and upon receiving additional feedback from the orientation sensor indicating that the wearable visualization device is in a storage orientation.

19. The wearable visualization device of claim 18, comprising one or more lighting elements communicatively coupled to the processor, wherein the processor is configured to instruct the one or more lighting elements to illuminate upon a determination that the wearable visualization device is in the storage configuration.

20. The wearable visualization device of claim 1, wherein the lens portion comprises an interior surface and an exterior surface opposite the interior surface, wherein the first display screen and the second display screen are configured to project the light onto the interior surface, wherein, in an equipped configuration of the wearable visualization device on the user, the interior surface is configured to be oriented toward the eyes of the user, is configured to reflect the portion of the light and to generate the reflection of the eyes of the user, and is configured to be sampled by the camera to enable acquisition of the image data.

\* \* \* \* \*